(12) United States Patent
Yoneyama

(10) Patent No.: US 6,996,801 B2
(45) Date of Patent: Feb. 7, 2006

(54) SYSTEM AND METHOD FOR AUTOMATICALLY GENERATING PROGRAM

(75) Inventor: Hideharu Yoneyama, Tokyo (JP)

(73) Assignee: NEC Corporation, Tokyo (JP)

( * ) Notice: Subject to any disclaimer, the term of this patent is extended or adjusted under 35 U.S.C. 154(b) by 773 days.

(21) Appl. No.: 09/903,683

(22) Filed: Jul. 13, 2001

(65) Prior Publication Data

US 2002/0059314 A1 May 16, 2002

(30) Foreign Application Priority Data

Jul. 14, 2000 (JP) .............................. 2000-213855

(51) Int. Cl.
  *G06F 9/44* (2006.01)
(52) U.S. Cl. .................. 717/107; 717/112; 717/117
(58) Field of Classification Search ........ 717/100–123; 707/100–102
  See application file for complete search history.

(56) References Cited

U.S. PATENT DOCUMENTS 5,815,717 A * 9/1998 Stack ..................... 717/105
6,311,323 B1 * 10/2001 Shulman et al. ............ 717/111
6,591,272 B1 * 7/2003 Williams .................. 707/102

FOREIGN PATENT DOCUMENTS

JP 10-111802 4/1998
JP 11-224184 8/1999

OTHER PUBLICATIONS

"Microsoft Visual FoxPro Version 3.0 Macintosh Reviewers Guide", Microsoft Corp., pp.: 1-29, Jan. 1996.*

* cited by examiner

*Primary Examiner*—Ted T. Vo
(74) *Attorney, Agent, or Firm*—McGinn IP Law Group, PLLC

(57) ABSTRACT

An automatic software component creating system includes a software component definition data storage section which stores software component definition data therein, a software component creation rule storage section which stores software component creation rules therein, and a client program creation rule storage section which stores client program creation rules therein. A software component creating section creates a software component module with one or more software components based on the software component definition data and the software component creation rules in response to a start instruction. A client program creating section creates a client program source code based on the software component definition data, the software component module, and the client program creation rules, when the software component module is created.

15 Claims, 19 Drawing Sheets

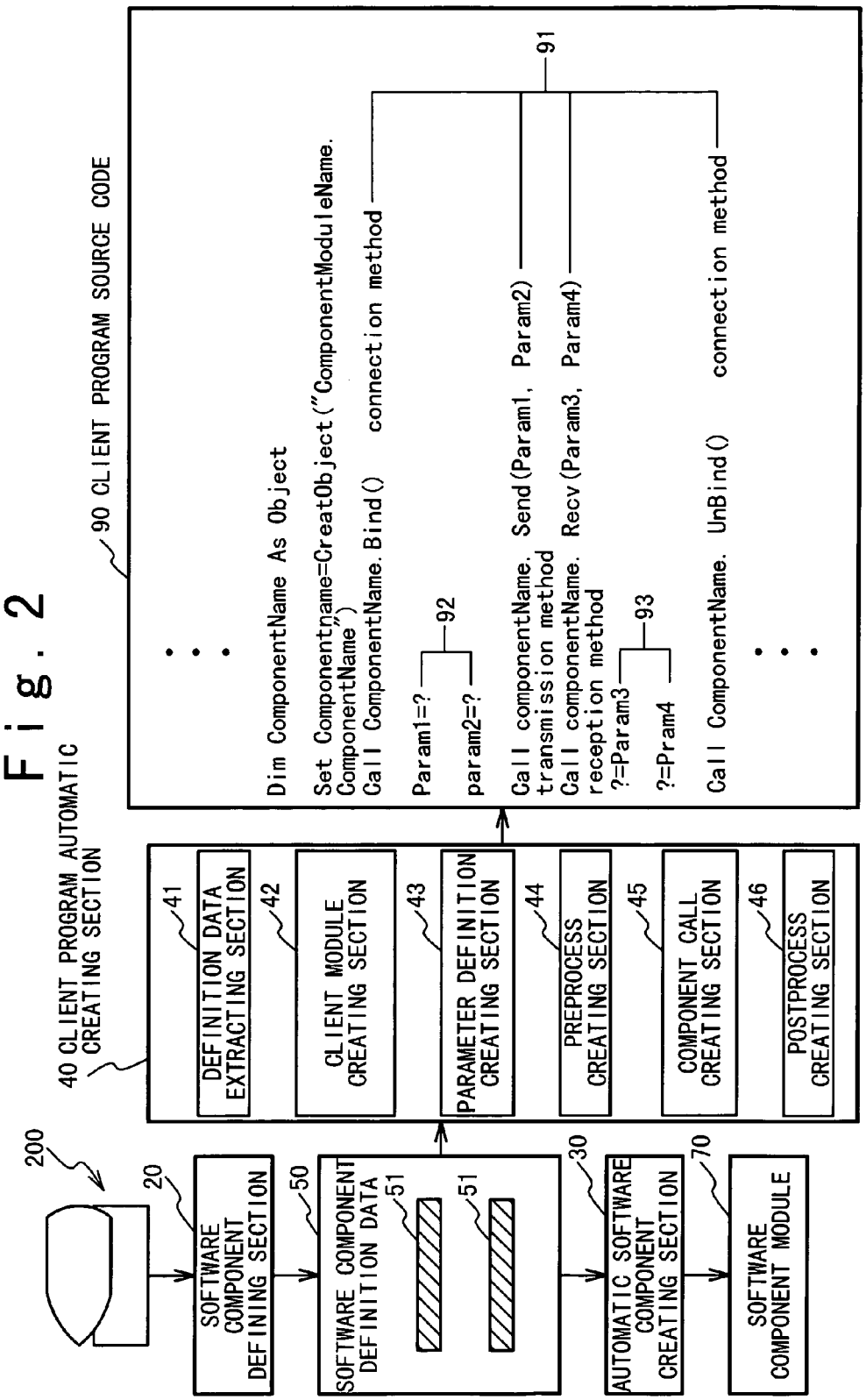

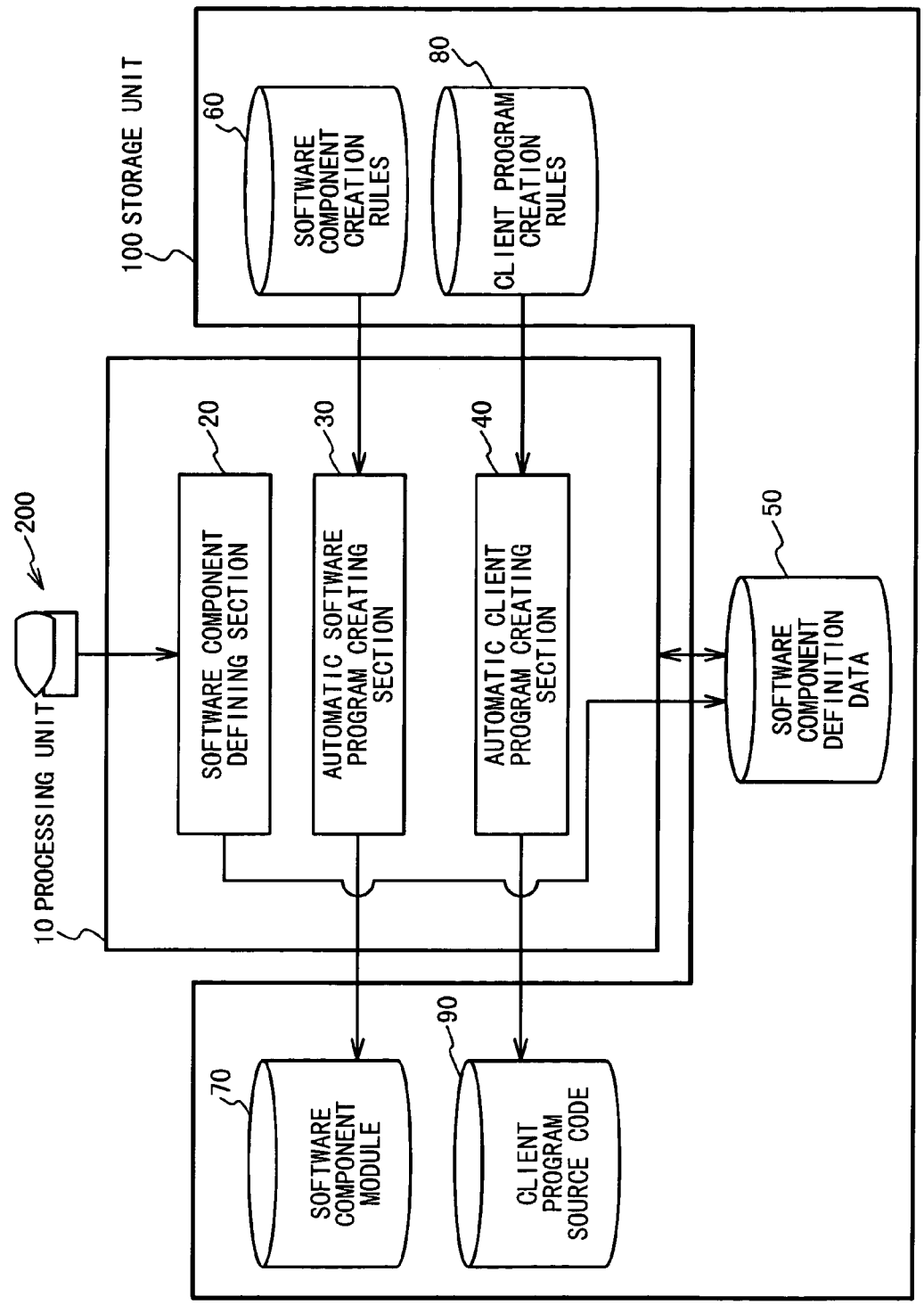

Fig. 6A

MODULE DATA 51

MODULE NAME···511

Fig. 6B

COMPONENT DATA 52

COMPONENT NAME···521

COMPONENT ATTRIBUTE DATA···522

Fig. 6C

METHOD DATA 53

METHOD NAME···531

METHOD ATTRIBUTE DATA···532

METHOD CALLING FORMAT DATA···533

METHOD CALL ORDER DATA···534

Fig. 6D

PARAMETER DATA 54

PARAMETER NAME···541

PARAMETER TYPE···542

PARAMETER INPUT/OUTPUT TYPE DATA···543

SYSTEM AND METHOD FOR AUTOMATICALLY GENERATING PROGRAM

BACKGROUND OF THE INVENTION

1. Field of the Invention

The present invention relates to automatic creation of a program. More particularly, the present invention relates to a system and method for automatically creating a program such as a software component and a client program using this component.

2. Description of the Related Art

ActiveX pronounced by Microsoft Corporation makes it easy to achieve a distributed computer system and division of software into components, under a Windows-based network environment. In conjunction with it, the automatic creation of a component has been recently tried.

As this type of a conventional technique, there is COMTI available from Microsoft Corporation, which creates an ActiveX component to access to a mainframe. However, although COMTI can create the component for accessing to the mainframe, COMTI cannot create a client program using the created component. For this reason, a program developer needs to develop the client program separately and manually on the basis of the opened or released data of the created components.

As another conventional example of a technique for automatically creating a component, a system and method for creating an object oriented database operation program is disclosed in Japanese Laid Open Patent Application (JP-A-Heisei 11-224184). In this reference, a schema data defined in an object oriented database is acquired, a program for an automation server (code component) is automatically created for an automation communication based on the acquired schema data and a program template file, and a client program serving as an external application is automatically created using a schema class of a database opened by this automation server, and its attribute and its method at the same time.

If the client program using the created components is separated from the creation of the components and separately and manually developed, this imposes a large burden on the developer of the client program, such as the increase in the number of work steps. Also, the development of the client program is decelerated in the worst case.

Problems in the conventional technique will be described by taking as an example, the creation of software components having a function of accessing to a transaction process program running on a mainframe and a client program using the same.

As shown in FIG. 1A, the access to a transaction process program 301 running on a mainframe (for example, ACOS2/4/6 available from NEC) 300 has been conventionally executed from a private online terminal 302 such as ETOS52G. FIG. 1B shows an example of an operational procedure from the private online terminal 302 to the transaction process program 301. In this example, a message is sent to the transaction process program 301 on the mainframe 300 from the private online terminal 302 in an order of a message "M1", a message "M2" and a message "M3". Accordingly, the transaction process program 301 executes a series of sequences. In the messages "M1" to "M3", several parameters "PR1" to "PR3" are specified as necessary. The individual parameter has any one of an input parameter, an output parameter, an input/output parameter and no operation. Its state is dynamically changed on the basis of a message ID among the messages "M1" to "M3".

If the access function to the transaction process program on such a mainframe is enabled from a Windows-based general personal computer other than the private online terminal, a software component 303 is created in which methods "MT1" to "MT3" respectively corresponding to the messages "M1" to "M3" are installed as shown in FIG. 1C, and also a client program 304 is created using the same. In the conventional technique, the software component 303 is automatically created from various definition data necessary to create the software component. The client program 304 is created separately and manually by a developer of the client program based on the opened or released data of the created software component.

In this case, as a problem, the order of starting the methods "MT1" to "MT3" is not known even if the opened or released data of the created software component 303 is viewed. Thus, it is not easy for the developer of the client program 304 to prepare the description of the order of calling the methods "MT1" to "MT3". In order to understand the order of starting the methods "MT1" to "MT3", it is necessary to know that the method "MT1" corresponds to the message "M1", the method "MT2" corresponds to the message "M2", and the method "MT3" corresponds to the message "M3", respectively, and that the transmission of the messages in the order of the messages "M1" to "M3" is required in the specification of the transaction process program 301 on the mainframe 300. For these purposes, both of knowledge with regard to the component and knowledge with regard to a transaction process in a mainframe are required. Usually, the developer of the client program, although having the knowledge of the component, does not have the knowledge of the mainframe.

As another problem, although data about the type of each of the parameters of the methods "MT1" to "MT3" can be known from their opened or released data, the state of the individual parameter is unknown among the states of the input parameter, the output parameter, the input/output parameter and the no operation. Thus, it is not easy for the developer of the client program 304 to prepare the description of a process for setting a value for a parameter required before and after calling the methods "MT1" to "MT3" in the client program 304, and a process for acquiring the value from the parameter. For example, if the parameter "PR1" is the input parameter, it is necessary to describe the process for setting the value to the parameter "PR1" before calling the method "MT1". In a case of the output parameter, it is necessary to describe the process for acquiring the value of the parameter "PR1" after calling the method "MT1". In a case of the input/output parameter, it is necessary to describe the process for setting the value to the parameter "PR1" before calling the method "MT1", and it is also necessary to describe the process for acquiring the value of the parameter "PR1" after calling. In order to understand the type of such a parameter, it is necessary to have the knowledge with regard to the treatment of the parameters in the transaction process in the mainframe 300, in addition to the knowledge with regard to the component, similarly to the case of understanding the order of actuating the methods "MT1" to "MT3".

The developer of the client program 304 may inquire of a technician for the mainframe 300 about the definition of the order of starting the methods "MT1" to "MT3" and about the types of the respective parameters. However, because of the completion of the development of the software component, there may be a case that the technician for the mainframe 300 having relation to the development of the software component does not exist at that time, and the inquiry is impossible. Even in the case of the existence of the technician, the inquiry itself is trouble for both the developer and the technician. Moreover, when the developer inquires of another mainframe technician about them, the technician having no relation to the development of the software component does not understand the component, even if knowing which parameter is responsible for the input or the output, or even if knowing the order of sending out the messages. Thus, it is difficult to carry out the explanation so that the developer of the client program can understand.

On the other hand, Japanese Laid Open Patent Application (JP-A-Heisei 11-224184) discloses a technique for automatically creating a client program serving as an external application using a schema class of a database published by an automation server, which is automatically created, and its attribute and its method. However, the client program disclosed therein is the interface to access to the database. This is originally data corresponding to a $C^{++}$ class at a stage of the development of an object oriented database, and it does not require to a client side the concepts of an calling order (sequence), an input, an output and an input/output. Thus, the technique disclosed therein cannot solve the above-mentioned problems of the conventional technique.

In conjunction with the above description, a code generating apparatus in an application field of a distributed object system is disclosed in Japanese Laid Open Patent application (JP-A-Heisei 10-111802). This reference is related to a method which is implemented in a computer which is on a network and automatically assembles an object independent on language to generate a network application used for a distributed object system. The method is composed of a step of receiving schematic representation of the network application, and the schema representation defines a plurality of links among distributed object representations. The method is further composed of a step of loading the schematic representation of the network application in a symbol table, and storing a portion of the schematic representation in the symbol table as a plurality of entries. The method is further composed of a step of determining a least one program source file which should be generated and at least one corresponding program template which should be used, and the program template contains references to the plurality of entries in the symbol table. The method is further composed of a step of combining the plurality of entries in the symbol table with at least one corresponding program template, which are compiled thereby, and generating at least one program source file suitable for the portion of the network application.

SUMMARY OF THE INVENTION

Therefore, an object of the present invention is to provide an automatic program creating system and method in which software components and a client program using the same are created.

Another object of the present invention is to provide an automatic program creating system and method in which there are stored only data necessary to create software components to access to a transaction process program running on a mainframe, but also a definition data containing data necessary to create a client program using the software components, and automatically create a source code of the client program based on this definition data.

Still another aspect of the present invention is to provide an automatic program creating system and method in which load of a developer of the client program can be largely reduced.

In an aspect of the present invention, an automatic software component creating system includes a software component definition data storage section which stores software component definition data therein, a software component creation rule storage section which stores software component creation rules therein, and a client program creation rule storage section which stores client program creation rules therein. A software component creating section creates a software component module with one or more software components based on the software component definition data and the software component creation rules in response to a start instruction. A client program creating section creates a client program source code based on the software component definition data, the software component module, and the client program creation rules, when the software component module is created.

Here, the software component definition data includes one module data which includes at least one component data, which includes at least one method data, which includes at least one parameter data. In this case, it is desirable that the module data has a module name, the component data has component data and component attribute data, the method data has a method name, method attribute data, method call format data, and method call order data, and the parameter data has a parameter name, a parameter type, and a parameter type data.

Also, the automatic software component creating system may further include a software component defining section which defines the software component definition data from inputted data to store in the software component definition data storage section. In this case, the software component defining section may include a component data defining section, a method data defining section and a parameter data defining section. The component data defining section defines the component data associated with the module data from the inputted data. The method data defining section defines the method data associated with the component data from the inputted data. The parameter data defining section defines the parameter data associated with the method data from the inputted data.

Also, the software component creating section may include a parameter creating section, a method creating section, a component creating section, and a module creating section. The parameter creating section creates parameter(s) from the software component definition data and parameter creation rules in response to a parameter creation request. The method creating section generates the parameter creation request which creating method(s) from the software component definition data and method creation rules in response to a method creation request. The component creating section generates the method creation request while creating component(s) from software component definition data and component creation rules in response to a component creation request. The module creating section generates the component creation request while creating the software component module from the software component definition data and module creation rules.

In this case, the software component creation rules may include module creation rules, the component creation rules, the method creation rules, and the parameter creation rules. In each of the module creation rules, a rule for creation of a project file of the module is described. The component creation rules includes component framework creation rules in each of which a rule for creation of a framework of the component is described, property creation rules in each of which a rule for creation of property of the component is described, and initial value creating rules, in each of which initial values to be set in the property are described. The method creation rules includes method framework creation rules in each of which a rule for creation of a framework of the method is described, and method logic creation rules in each of which logic to be executed by the method is described. In each of the parameter creation rules, it is described that a parameter name and a type of parameter are linked.

Also, the client program source code creating section may include a parameter definition creating section, a pre-process creating section, a component call creating section, a post-process creating section and a client module creating section. The parameter definition creating section creates declaration and definition of each of the parameters corresponding to a method to be called from a client program from the software component definition data and parameter definition creation rules of the client program creation rules in response to a parameter definition creation request. The pre-process creating section creates a pre-process which needs to be executed prior to a call of the software component based on the software component definition data and pre-process creation rules of the client program creation rules in response to a pre-process creation request. The component call creating section creates a call process of each of the methods of the software component based on the software component definition data and component call creation rules of the client program creation rules in response to a component call creation request. The post-process creating section creates a post-process, which needs to be executed after the call of the software component based on the software component definition data and post-process creation rules of the client program creation rules in response to a post-process creation request. The client module creating section creates a framework of the client program source code based on the software component definition data and client module creation rules of the client program creation rules while respectively outputting the parameter definition creation request, the pre-process creation request, the component call creation request and the post-process creation request to the parameter definition creating section, the pre-process creating section, the component call creating section, and the post-process creating section.

In another aspect of the present invention, an automatic software component creating method is attained by (a) creating a software component module with one or more software components based on software component definition data and software component creation rules in response to a start instruction; and by (b) creating a client program source code based on the software component definition data, the software component module, and client program creation rules, when the software component module is created.

Here, the software component definition data includes one module data which includes at least one component data, which includes at least one method data, which includes at least one parameter data. Also, the module data has a module name, the component data has component data and component attribute data, the method data has a method name, method attribute data, method call format data, and method call order data, and the parameter data has a parameter name, a parameter type, and a parameter type data.

Also, the automatic software component creating method may include the step of (c) defining the software component definition data from inputted data. In this case, the (c) defining step may be attained by defining the component data associated with the module data from the inputted data; by defining the method data associated with the component data from the inputted data; and by defining the parameter data associated with the method data from the inputted data.

Also, the (a) creating step may be attained by (d) generating a component creation request while creating the software component module from the software component definition data and module creation rules of the software component creation rules; by (e) generating a method creation request while creating component(s) from software component definition data and component creation rules of the software component creation rules in response to the component creation request; by (f) generating a parameter creation request which creating method(s) from the software component definition data and method creation rules of the software component creation rules in response to the method creation request; and by (g) creating parameter(s) from the software component definition data and parameter creation rules in response to the parameter creation request.

Also, the (b) creating step may be attained by (h) creating declaration and definition of each of the parameters corresponding to the method to be called from a client program from the software component definition data and parameter definition creation rules of the client program creation rules in response to a parameter definition creation request; by (i) creating a pre-process which needs to be executed prior to a call of the software component based on the software component definition data and pre-process creation rules of the client program creation rules in response to a pre-process creation request; by (j) creating a call process of each of the methods of the software component based on the software component definition data and component call creation rules of the client program creation rules in response to a component call creation request; by (k) creating a post-process, which needs to be executed after the call of the software component based on the software component definition data and post-process creation rules of the client program creation rules in response to a post-process creation request; and by (l) creating a framework of the client program source code based on the software component definition data and client module creation rules of the client program creation rules while generating the parameter definition creation request, the pre-process creation request, the component call creation request and the post-process creation request.

BRIEF DESCRIPTION OF THE DRAWINGS

FIG. 2 is a function block diagram showing a system for automatically creating a program according to an embodiment of the present invention;

FIG. 3 is a block diagram showing a system for automatically creating a program according to an embodiment of the present invention;

FIGS. 6A to 6D are views showing an example of a part of data included in a module data, a component data, a method data and a parameter data within the software component definition data;

DESCRIPTION OF THE PREFERRED EMBODIMENT

Figure 1A:
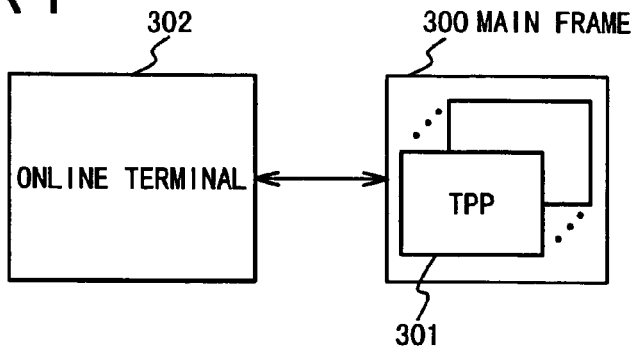
FIGS. 1A to 1C are views explaining a conventional technique.
Figure 1B:
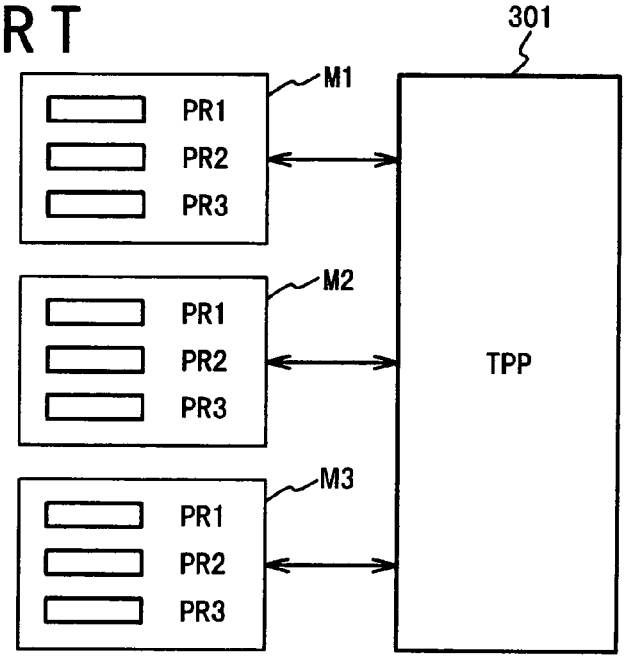
Figure 1C:
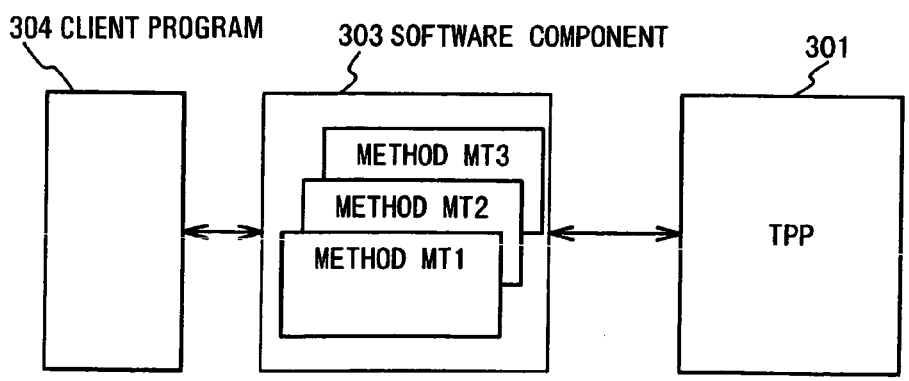

Hereinafter, an automatic program creating system of the present invention will be described below in detail with reference to the attached drawings.

FIG. 2 is a block diagram showing the structure of the automatic program creating system according to the first embodiment of the present invention. With reference to FIG. 2, a system for automatically creating a program in the first embodiment has a software component defining section 20 for creating software component definition data 50 based on data inputted from an input/output unit 200 by a user. In order to allow not only the creation of software components but also the creation of a client program, the software component defining section 20 can simultaneously define not only data necessary to create the software components as the definition data, but also definition data 51 necessary to create the client program. Also, the definition data 51 necessary to create the client program can be added to the already stored definition data.

As an example of the definition data 51 necessary to create the client program, there is a data of a method call order. Also, as another example, there is a data to define each parameter in the methods, as any one of an input parameter, an output parameter, an input/output parameter and no operation.

The system for automatically creating a program according to the first embodiment has two program creating sections such as an automatic software component creating section 30 and an automatic client program creating section 40. The automatic software component creating section 30 automatically creates a software component module 70 based on the definition data of the software component definition data 50 in response to a start instruction from a user input/output apparatus 200. On the other hand, the automatic client program creating section 40 automatically creates a source code 90 of the client program for the software component module 70, by using the data 51 necessary to create the client program included in the software component definition data 50, when the software component module 70 is created.

The automatic client program creating section 40 is provided with a definition data extracting section 41, a client module creating section 42, a parameter definition creating section 43, a pre-process creating section 44, a component call creating section 45 and a post-process creating section 46.

The definition data extracting section 41 extracts a definition data necessary to create a client program from the software component definition data 50.

The client module creating section 42 creates the frame of an entire module based on the extracted definition data. Then, the parameter definition creating section 43 creates within the frame, the declarations of variables used as the parameters for an input, an output and an input/output, and a process for initializing the parameters.

The pre-process creating section 44 creates the declaration of the component, the input parameter necessary before calling the component, and a process for setting values for properties.

The component call creating section 45 creates processes for calling methods.

The post-process creating section 46 creates the processes required after calling the component such as processes for acquiring values of the output parameters. In this way, the source code 90 of the client program is created.

The characteristic description is exemplified in the source code 90 of the client program in FIG. 2. A portion for a symbol 91 denotes a description of method call processes which are automatically created by the component call creating section 45 based on the definition data 51 necessary to create the client program in the software component definition data 50. This example is described so as to call the methods in an order of a connection method, a transmission method, a reception method and a disconnection method based on the definition data indicating that the methods must be called in an order of connection, transmission, reception and disconnection.

A portion for a symbol 92 denotes a description of processes for setting values for parameters, and the description of the processes is automatically created by the pre-process creating section 44 based on the types of the parameters of the method. From the description of [Parameter1=?] and [Parameter2=?] (Parameter1 and Parameter2 are the names of the parameters), a developer of the client program can easily recognize that the parameters are input parameters and that the values need to be set before calling a method. Here, the data of an actual input source (for example, the data about a predetermined input column in GUI) is later set for the portion [?] by a manual operation. At this time, if the name of the parameter is defined as a name having a proper meaning, an operation to check the usage of a component can be minimized.

A portion for a symbol 93 denotes a description of processes for acquiring values of parameters, and the description of processes is automatically created by the post-process creating section 46 based on the type data of the parameter of the method. From the description of [Parameter3=?] and [Parameter4=?], the developer of the client program can easily recognize that the parameters are output parameters and that values need to be acquired after calling a method. Here, the data of an actual output destination (for example, the data about a predetermined output column in GUI) is later set for the portion [?] by a manual operation. At this time, if the name of the parameter is defined as a name having a proper meaning, an operation to check usage of a component can be minimized.

The source code 90 of the client program automatically created by the automatic client program creating section 40 serves as a sample (template) when the developer of the client program develops the client program using the software component module 70 created by the automatic software component creating section 30. The developer completes the non-defined portions (for example, the portions "?" in the symbols 92, 93) in the source code 90 of the automatically created client program, and prepares the GUI portion of the client program by using Visual Basic, as necessary, and then completes the source code 90 of the client program.

With reference to FIG. 3, the system for automatically creating a program according to the first embodiment of the present invention includes a processor 10, a memory 100 and a user input/output unit 200 as a main body. The user input/output unit 200 is composed of an input unit such as a keyboard and a mouth, and a display such as LCD. The memory 100 is formed of a semiconductor memory, a magnetic disc device. The memory 100 stores in advance software component creation rules 60 and client program creation rules 80, and also stores the software component definition data 50 during a system process. Further, the memory 100 stores the created software component module 70 and the client program source code 90. The processing unit 10 is composed of a CPU, and software running on the CPU. They provide the three function sections of the software component defining section 20, the automatic software component creating section 30 and the automatic client program creating section 40.

The software component defining section 20 is a kind of an editor. The software component defining section 20 provides a user interface in order that a user defines various data necessary to create the software components and the client program using the same through the user input/output unit 200. The software component defining section 20 acquires the software component definition data 50 through an input of data from a screen or an import of the data. The acquired software component definition data 50 is stored in the memory 100. Then, the automatic software component creating section 30 and the automatic client program creating section 40 suitably refers to it.

The client program creation rules 80 describe rules when the client program is created on the basis of the software component definition data 50. Actually, the client program creation rules 80 firstly describe a kind of definition data, and a manner of creating the same. An actual value of the definition data is acquired from the software component definition data 50. For example, a certain rule describes the execution of the definition of a framework for a client program. A component name required at that time is acquired from the software component definition data 50. Similarly, other rules describes the executions of the definitions with regard to a parameter definition, a pre-process, a component call process, and a post-process, and specifies a method of defining each of them. The actual values of a parameter name and a type necessary to create them are acquired from the software component definition data 50.

The client program creation rules 80 also describe output data in relation to the definition data and output positions or an output order. For example, it is described in the process for setting a value for a parameter created in the pre-process that data should be outputted immediately before calling the method containing its parameter. Also, it is described in the process for acquiring a value from a parameter created in the post-process that data is outputted immediately after calling the method containing the parameter.

It should be noted that the client program creation rules 80 also describe output data having no relation to the definition data and data with regard to the output positions and the output order. For example, there are an error process, a pre-process and a post-process that are carried out fixedly.

The software component creation rules 60 describe rules when a software component is created on the basis of the software component definition data 50. Similarly to the client program creation rules 80, the software component creation rules 60 describe a kind of a definition data, a manner of creating the same, output data in relation to the definition data, the output data or the output order, output data having no relation to the definition data and the output positions or the output order.

The automatic software component creating section 30 creates the software component module 70 based on the software component definition data 50 and the software component creation rules 60. The created software component module 70 is stored in the memory 100, in the case of the first embodiment.

The automatic client program creating section 40 creates the source code 90 of the client program using the software component created by the automatic software component creating section 30 based on the software component definition data 50 and the client program creation rules 80. The created source code 90 for the client program is stored in the memory 100 in the case of this embodiment.

Next, the respective units of the system for automatically creating a program in this embodiment will be described below in detail.

(1) Software Component Defining Section 20

Figure 4:
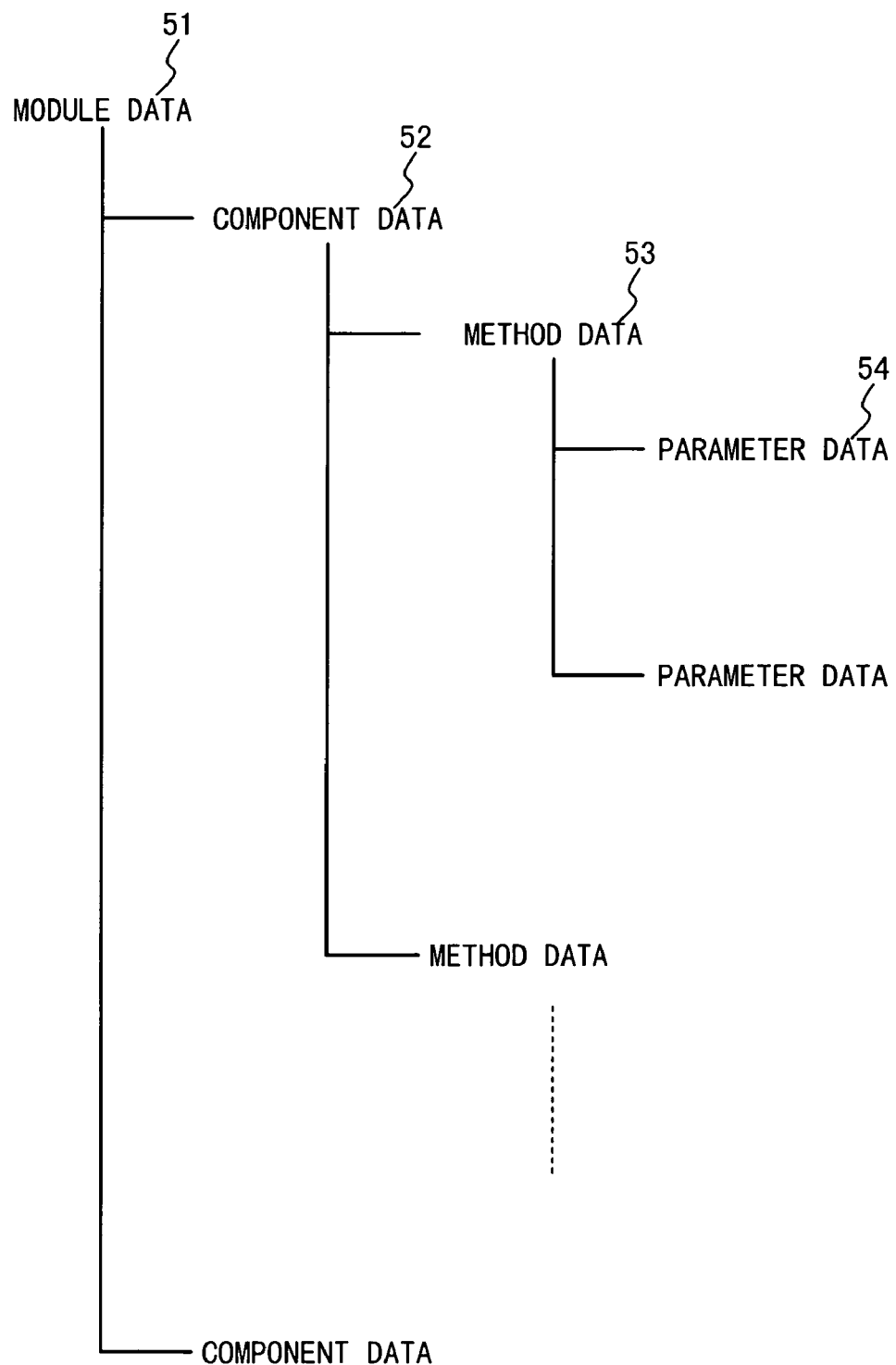
FIG. 4 is a view showing a schematic configuration of software component definition data.

Typically, a plurality of software components can exist in one software component module. Also, a plurality of methods can exist in one software component. Moreover, a plurality of parameters can exist in one method. For this reason, definition data necessary to create one software component module typically have a hierarchical structure shown in FIG. 4. In short, one or more component data 52 exist in association with one module data 51. One or more method data 53 exist in association with each component data 52. Moreover, one or more parameter data 54 exist in association with each method data 53.

Figure 5:
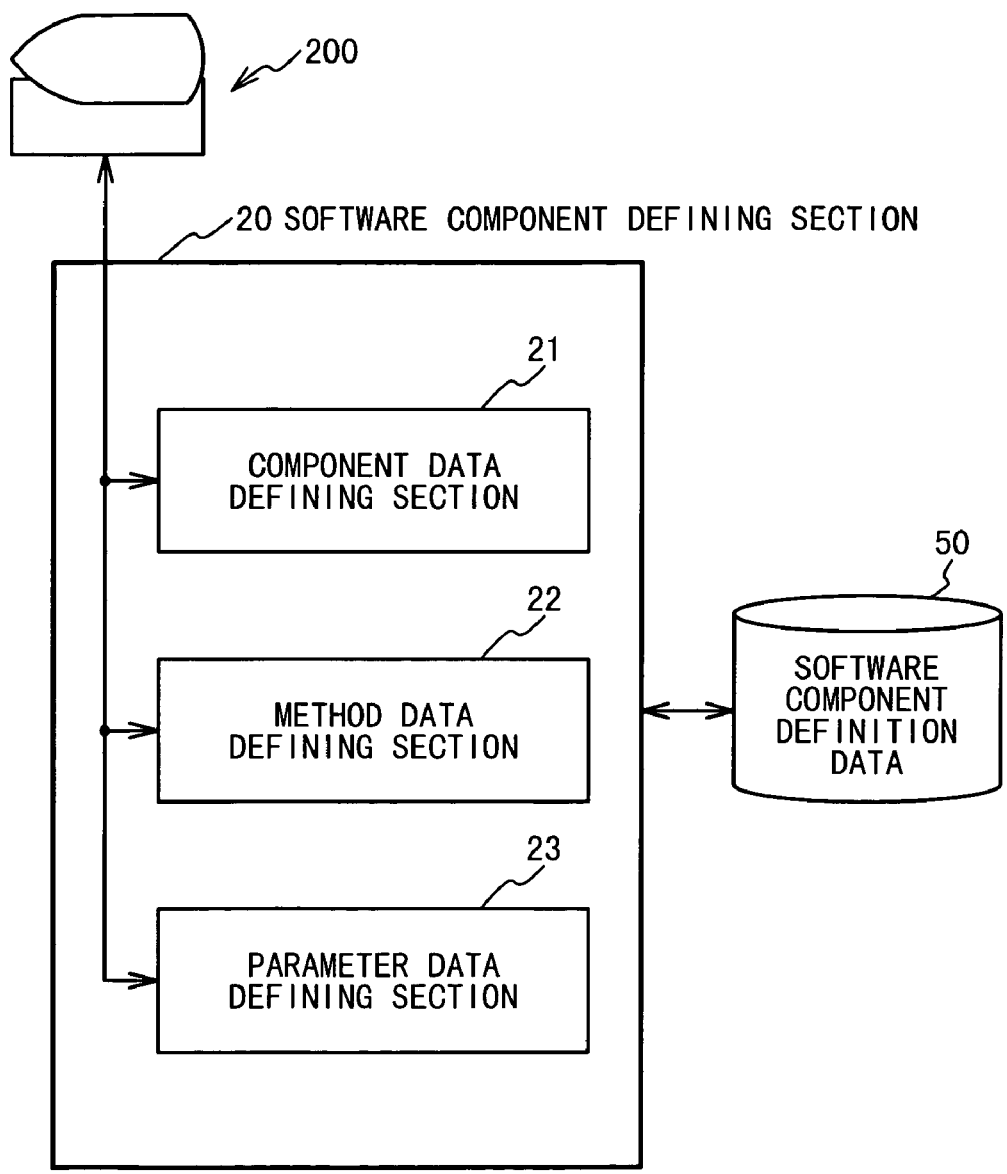
FIG. 5 is a block diagram showing a configuration example of a software component defining section.

The software component defining section 20 has three defining sections of a component data defining section 21, a method data defining section 22 and a parameter data defining section 23, as shown in FIG. 5, in correspondence to the hierarchical structure. The component data defining section 21 is used to define the data peculiar to the component (module data 51 and component data 52) for each software component included in the software component module. The method data defining section 22 is used to define the data peculiar to the method (method data 53) in association with the component data 52. Moreover, the parameter data defining section 23 is used to define the data peculiar to the parameter (parameter data 54) in association with the method data 53.

Here, in this embodiment, the respective defining sections 21 to 23 are also used to define the data necessary to create the client program, as well as the software component module. In short, the component data defining section 21 defines the component data to include the data necessary to create the client program. The method data defining section 22 defines the method data to include the data necessary to create the client program. Moreover, the parameter data defining section 23 defines the parameter data to include the data necessary to create the client program. Thus, the software component definition data having the hierarchical structure shown in FIG. 4 includes not only the data necessary to create the software component but also the data necessary to create the client program using the same.

FIGS. 6A to 6D show examples of the data included in the module data 51, the component data 52, the method data 53 and the parameter data 54.

With reference to FIG. 6A, the module data 51 includes a module name 511 that is a name of a software component module.

With reference to FIG. 6B, the component data 52 includes a component name 521 that is a name of a software component, and a component attribute data 522 indicative of an initial value (default parameter) of the component. As an example of the component attribute data 522, there is connection data to a mainframe. The connection data to the mainframe includes, for example, the data listed below:
IP Address of Mainframe=111.111.111.111;
Port Number of Mainframe=8000;
Timeout Value at Transmission=3; and
Timeout Value at Reception=3.

With reference to FIG. 6C, the method data 53 includes: a method name 531 that is a name of a method; a method attribute data 532 indicative of a method type, a type of a return value of a method; an data 533 of a method call form indicative of a transmission type, a reception type and a type of a transmission/reception type; and a method call order data 534 indicative of a necessary call order when there are a plurality of methods. It should be noted that as a method of defining the method call order data 534, a method may be employed of explicitly indicating the calling order of the self-methods in each method data 53. Or, a method may be employed of making an order of describing the plurality of method data 53 in association with the component data 52 coincide with the calling order of the methods.

With reference to FIG. 6D, the parameter data 54 includes a parameter name 541 that is a name of a parameter, a parameter type 542, and a parameter input/output type data 543. Desirably, the parameter name is defined as a name having a proper meaning. The parameter input/output type data 543 defines the parameter as any one among an input parameter, an output parameter, an input/output parameter and a no-operation parameter.

(2) Automatic Software Component Creating Section 30 and Software Component Creation Rules 60

Figure 7:
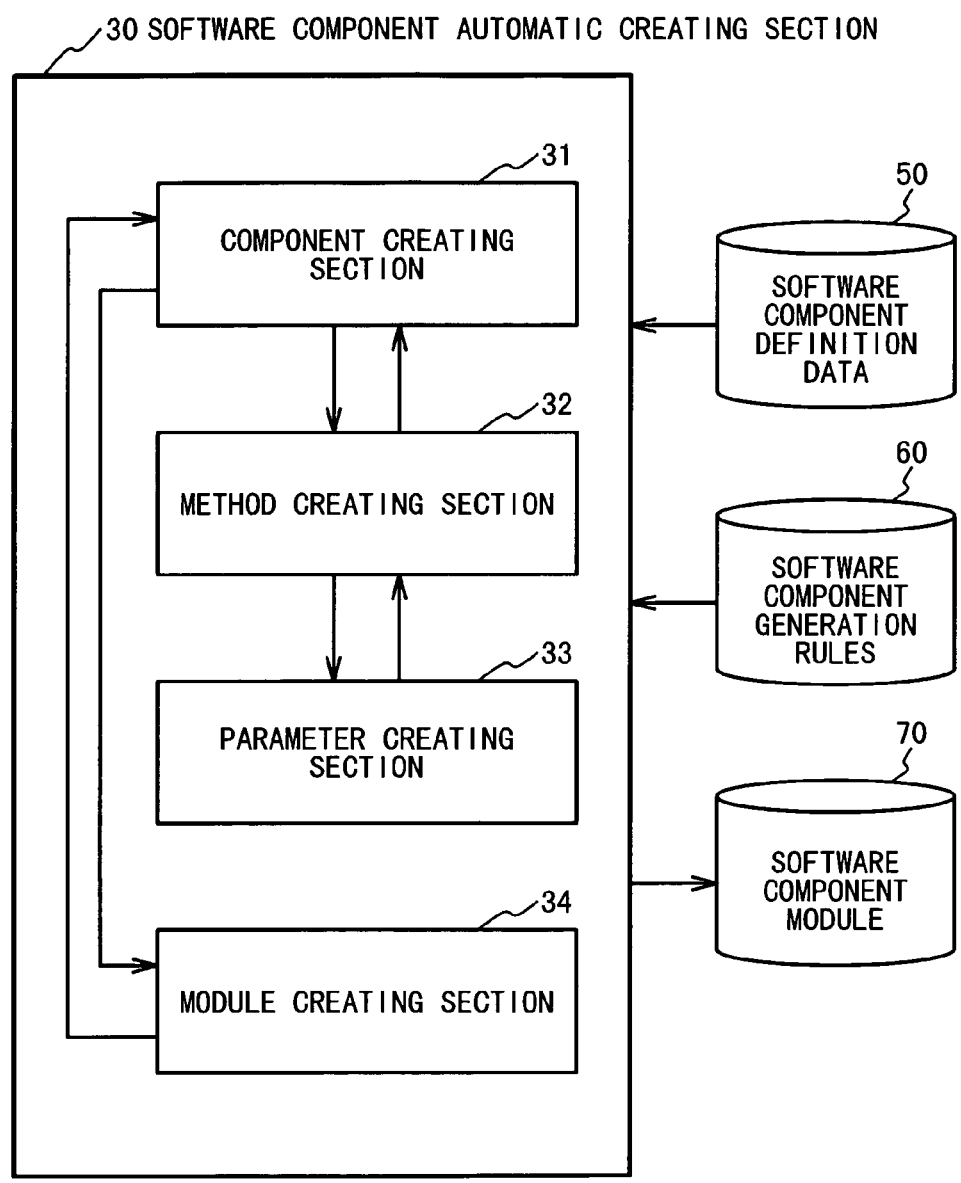
FIG. 7 is a block diagram showing a configuration example of an automatic software component creating section.
Figure 8:
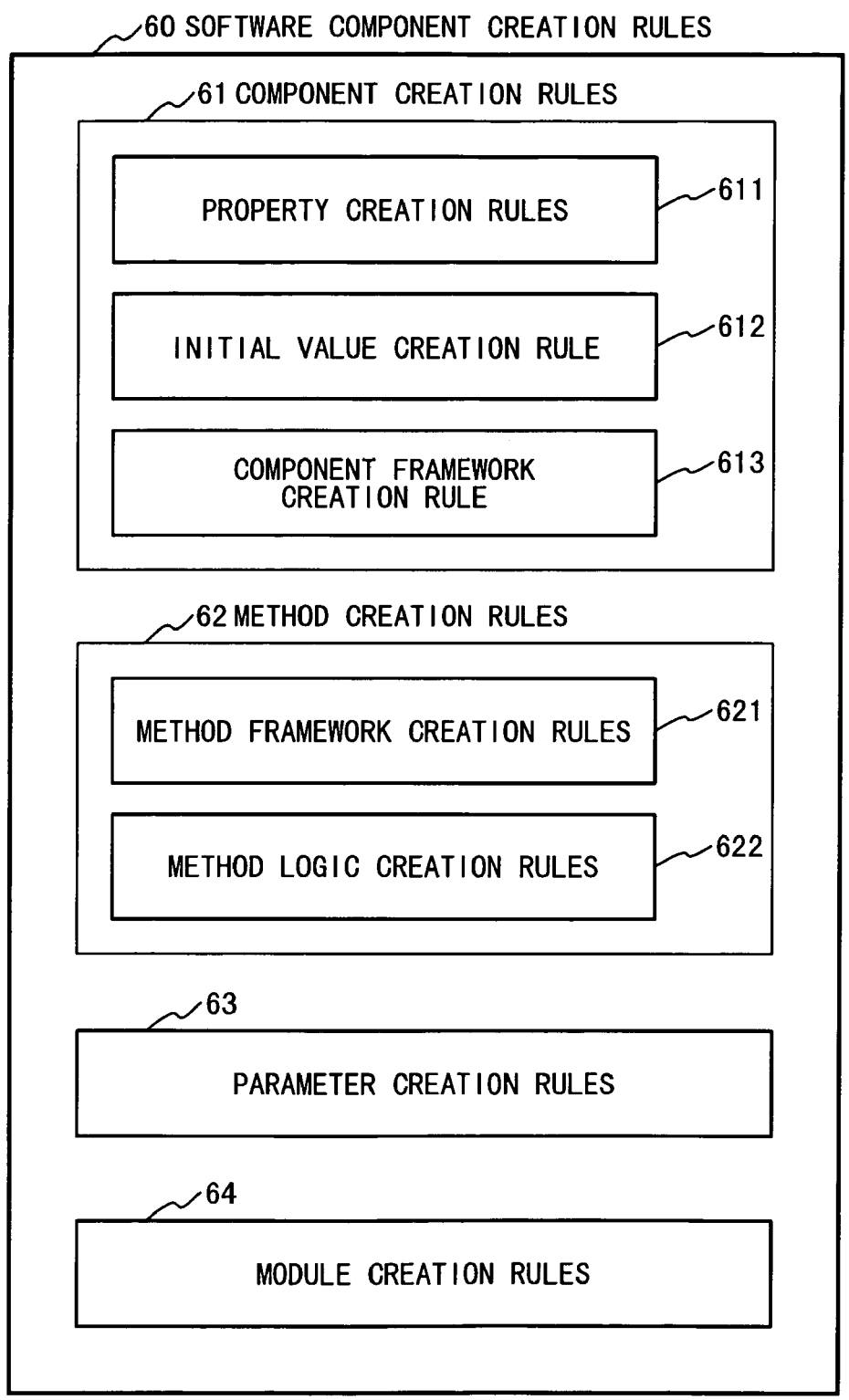
FIG. 8 is a block diagram showing an example of software component creation rules.

The automatic software component creating section 30 is provided with a component creating section 31, a method creating section 32, a parameter creating section 33 and a module creating section 34, as shown in FIG. 7. Also, the software component creation rules 60 are used when the automatic software component creating section 30 creates the software component module 70 based on the software component definition data 50. As shown in FIG. 8, the software component creation rules 60 include component creation rules 61, method creation rules 62, parameter creation rules 63 and module creation rules 64. Moreover, the component creation rules 61 contain property creation rules 611, initial value creation rules 612 and component framework creation rules 613, and the method creation rules 62 contain method framework creation rules 621 and method logic creation rules 622.

The parameter creating section 33 creates a parameter portion by suitably referring to the software component definition data 50 and the parameter creation rules 63 in response to a parameter creation request from the method creating section 32.

The method creating section 32 creates a method portion by suitably referring to the software component definition data 50 and the method creation rules 62 in response to a method creation request from the component creating section 31.

The component creating section 31 creates a component portion by suitably referring to the software component definition data 50 and the component creation rules 61 in response to a component creation request from the module creating section 32.

The module creating section 34 creates the software component module 70 as a whole by suitably referring to the software component definition data 50 and the module creation rules 64 and by suitably calling the component creating section 31.

The functions of the module creating section 34, the component creating section 31, the method creating section 32 and the parameter creating section 33 together with the content examples of the rules will be described below in detail in the above-mentioned order.

(2-1) Module Creating Section 34

Figure 9:
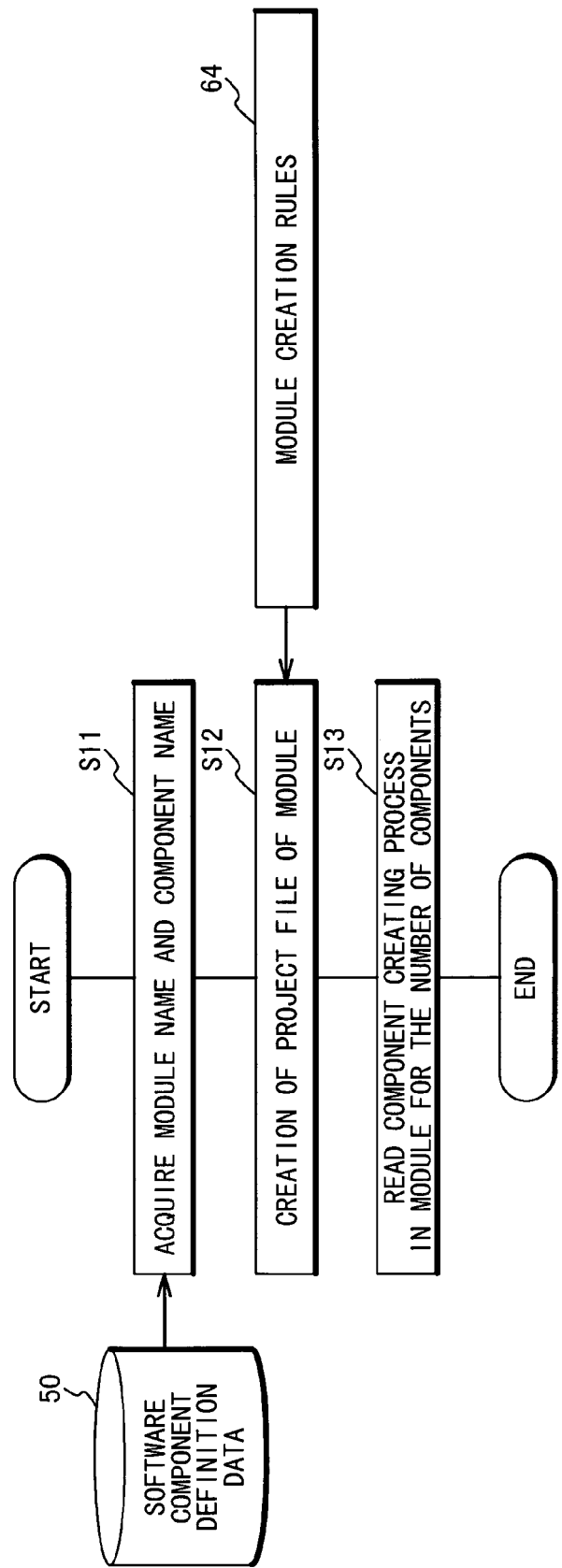
FIG. 9 is a flowchart showing a processing example of a module creating section within the automatic software component creating section.

FIG. 9 shows a processing example of the module creating section 34. The module creating section 34 firstly acquires the module name 511 in the module data 51 and the component names 521 of all the component data 52 associated with the module data 51 from the software component definition data 50 (S11). Next, the module creating section 34 creates a project file of a module in accordance with the acquired module name 511, the acquired component name 521, and a creation rule of the project file of the module existing in the module creation rules 64 (S12). For example, the following rule is described in advance in the creation rule of the project file of the module.

[A component name of a project is set for a portion of a component name in a template [Class=Component Name; Component Name.cls], and a module name of the project is set for a portion of a module name in [Name="Module Name", ExeName32="Module Name.dll", and a project file is created].

In this case, it is supposed that the module name 511 acquired at the step S11 is ComponentModuleName, and three component names 521 are "Component1", "Component2" and "Component3". At this time, the following project file is created.

Class=Componet1; Component1.cls
Class=Componet1; Component1.cls
Class=Componet1; Component1.cls
Name="ComponentModuleName"
ExeName32="ComponentModuleName.dll"

Here, "Component1", "Component2" and "Component3" are the files of the components. "ComponentModuleName.dll" is the file of the software component module.

Next, the module creating section 34 calls the process for creating the components in the module of the component creating section 31 for the number of components (S13). The component name 521 is passed for each call. The component created in accordance with the call is stored in the file of the component.

(2—2) Component Creating Section 31

Figure 10:
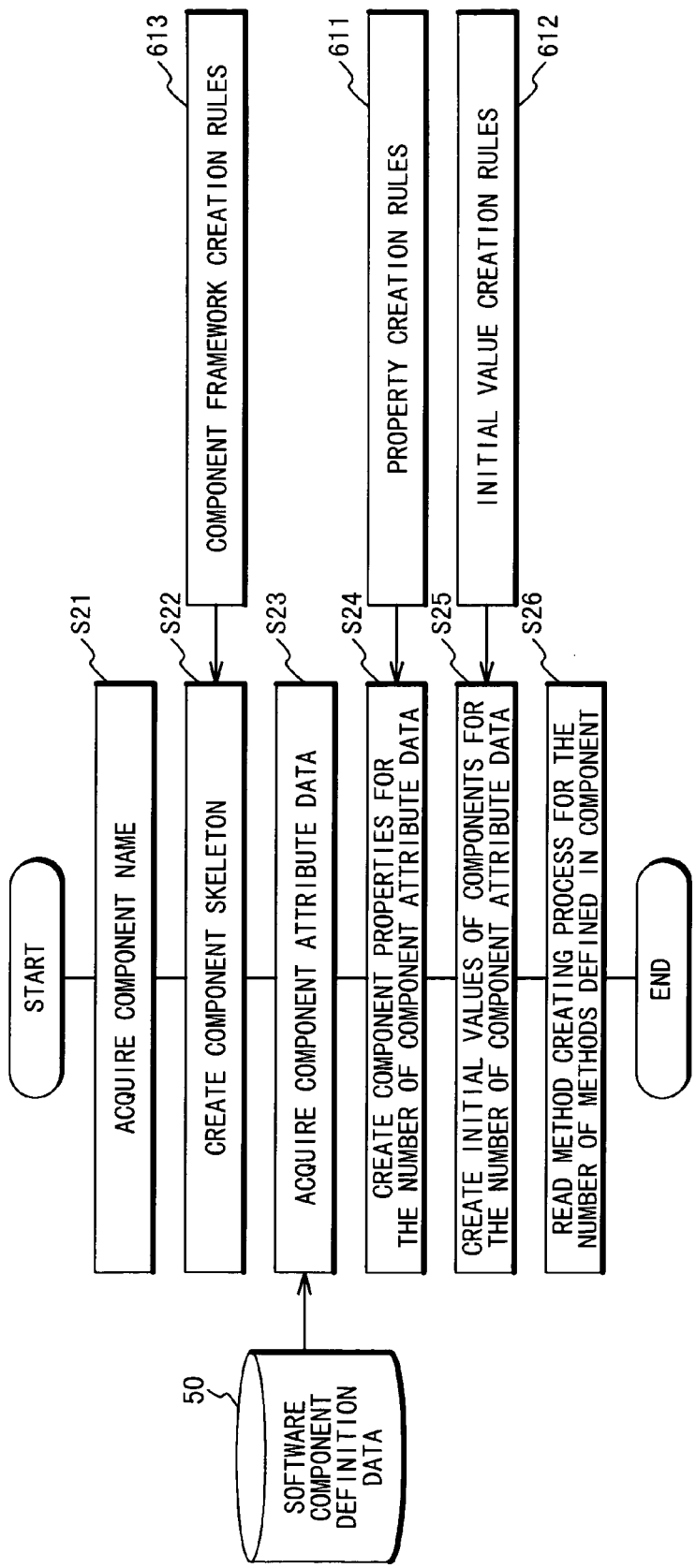
FIG. 10 is a flowchart showing a processing example of a component creating section within the automatic software component creating section.

FIG. 10 shows a processing example of the component creating section 31. When acquiring a component name 521 from the module creating section 34 (S21), the component creating section 31 firstly creates the framework of the component in accordance with the component framework creation rules 613 (S23). This process is equivalent to the process for creating a regular header corresponding to the acquired component name 521. The component framework creation rules 613 describe, for example, the following rule. Thus, the framework of the component is created in accordance with this rule.

[An acquired component name is set for a portion of a component name of a template listed below.
VERSION 1.0 CLASS
BEGIN
   Multiple=-1'True
   Persistable=0'NotPersistable
   DataBindingBehavior=0'vbNone
   DataSourceBehavior=0'vbNone
   MTSTansactionMode=0'NotAnMTSOb.ject
END
   Attribute VB-Name="ComponentName"
   Attribute VB-GlobalNameSpace=False
   Attribute VB-GlobalNameSpace=False
   Attribute VB-Creatable=True
   Attribute VB-Exposed=True]

Next, the component creating section 31 acquires the component attribute data 52 of the component from the software component definition data 50 (S23), and creates properties of the components for the number of acquired component attribute data in accordance with the property creation rules 611 (S24). Also, the component creating section 31 creates initial values for the number of acquired component attribute data in accordance with the initial value creation rules 612 (S25).

As the property creation rules 611, the templates are provided for the respective types of the component attribute data, that can exist in the software component definition data 50, such as IP address usage, port number usage and timeout usage. Each template has, for example, a form:

Public AAA As String

The component creating section 31 acquires the template corresponding to the name (AAA) of the acquired component attribute data from the property creation rules 611, and thereby creates the property corresponding to each component attribute data and type. Thus, in the case of the acquisition of the component attribute data such as a connection destination server name, an IP address of a mainframe, a port number of the mainframe, a timeout value in transmission and a timeout value in reception, the property corresponding to each of them is created.

Also, as the initial value creation rules 612, for example, there is the following rule.
[A property name corresponding to each component attribute data and its value are set for the following position of a template AAA=BBB, as initial values in a form of PropertyName=Value.
Private Sub Class-Intialize( )
AAA=BB
End Sub]

For example, the following process for creating initial values is created from such initial value creation rules 612 and the acquired component attribute data.
Private Sub Class-Intialize( )
MainFrameIP="111.111.111.111"
MainFramePort=8000
RcvTimeOut=3
SndTimeOut=3
End Sub Next, the component creating section 31 fetches the method names 531 in all the method data 53 associated with the component from the software component definition data 50, and then calls the method creating section 32 for the number of methods defined in the component (S26). The method name and the component name having its method are passed for each call.

(2-3) Method Creating Section 32

Figure 11:
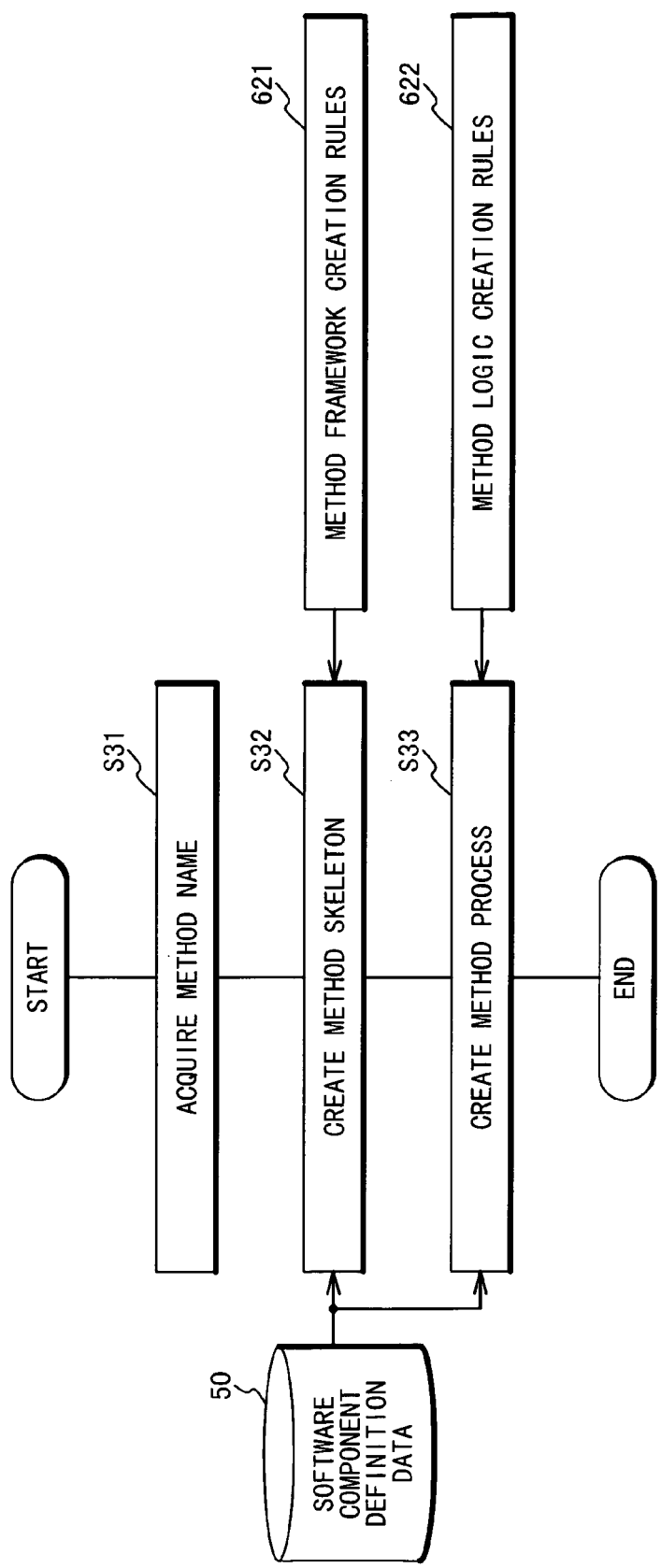
FIG. 11 is a flowchart showing a processing example of a method creating section within the automatic software component creating section.

FIG. 11 shows a processing example of the method creating section 32. When acquiring a method name and a component name having its method from the component creating section 31 (S31), the method creating section 32 firstly creates the framework of the method in accordance with the software component definition data 50 and the method framework creation rules 621 (S32). In the method framework creation rules 621, for example, there is the following rule.

[A method parameter and its type and a type of a return value are linked into a method name in a following format and then outputted.
Public Function Method Name (All Method Parameters) As Return Value Type
Method Process
End Function]

It should be noted that the process for creating the method parameter calls the parameter creating section 33. A parameter name, a method name having its parameter and a component name having its method are specified at a time of the call.

The following framework of a method is created through the above-mentioned process, when it is supposed that a method name is "Method1", a type of a return value is "Long", and two method parameters acquired by calling the parameter creating section 33 are "Param1 As Integer and Param2 As String".
Public Function Method1 (Param1 As Integer, Param2 As String) As Long
Method Process
End Function Next, the method creating section 32 creates the method process in accordance with the software component definition data 50 and the method logic creation rules 622 (S33). In a case of the method having a function to access to a mainframe, the created method process is a communication process with the mainframe. Since a template describing a communication process complying with an external interface of the mainframe is provided in the method logic creation rules 622 for each method and each method call type, the template corresponding to the method call type is selected, and a parameter name is set for the template. Thus, the method process is created. The creation of the data depending on the parameter is repeated for the number of parameters. The data peculiar to the method is created only once. The examples of the transmission type, the reception type and the transmission/reception type are as follows:

Transmission Type
Public Sub Method1 ( . . . Parameter . . . )
   WbRet=Send ( . . . Parameter . . . )
End
   Reception Type
Public Sub Method2 ( . . . Parameter . . . )
   WbRet=Recv ( . . . Parameter . . . )
End
   Transmission/Reception Type
Public Sub Method3 ( . . . Parameter . . . )
   WbRet=Send ( . . . Parameter . . . )
   WbRet=Recv ( . . . Parameter . . . )
End (2-4) Parameter Creating Section 33

Figure 12:
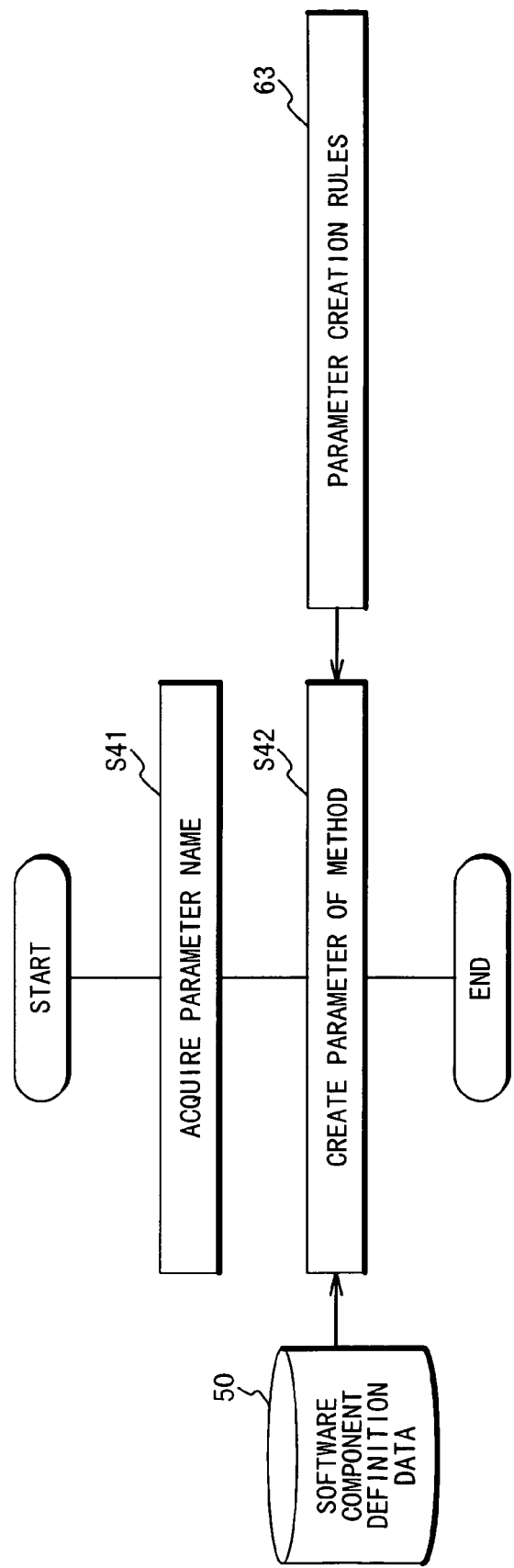
FIG. 12 is a flowchart showing a processing example of a parameter creating section within the automatic software component creating section.

FIG. 12 shows a processing example of the parameter creating section 33. When acquiring a parameter name, a method name to which it belongs and a component name from the method creating section 32 (S41), the parameter creating section 33 acquires the component data and the parameter type 542 associated with the method data from the software component definition data 50, and then creates a method parameter in accordance with the parameter creation rules 63 (S42).

A rule indicating that a parameter name and its type are linked through "As" to then create a method parameter is provided in the parameter creation rules 63. Thus, if the parameter name is assumed to be "Pram1" and its type is assumed to be "String", the following method parameter is returned back to the method creating section 32 as a call source.

Param1 As String (3) Automatic Client Program Creating Section 40 and Client Program Creation Rules 80

Figure 13:
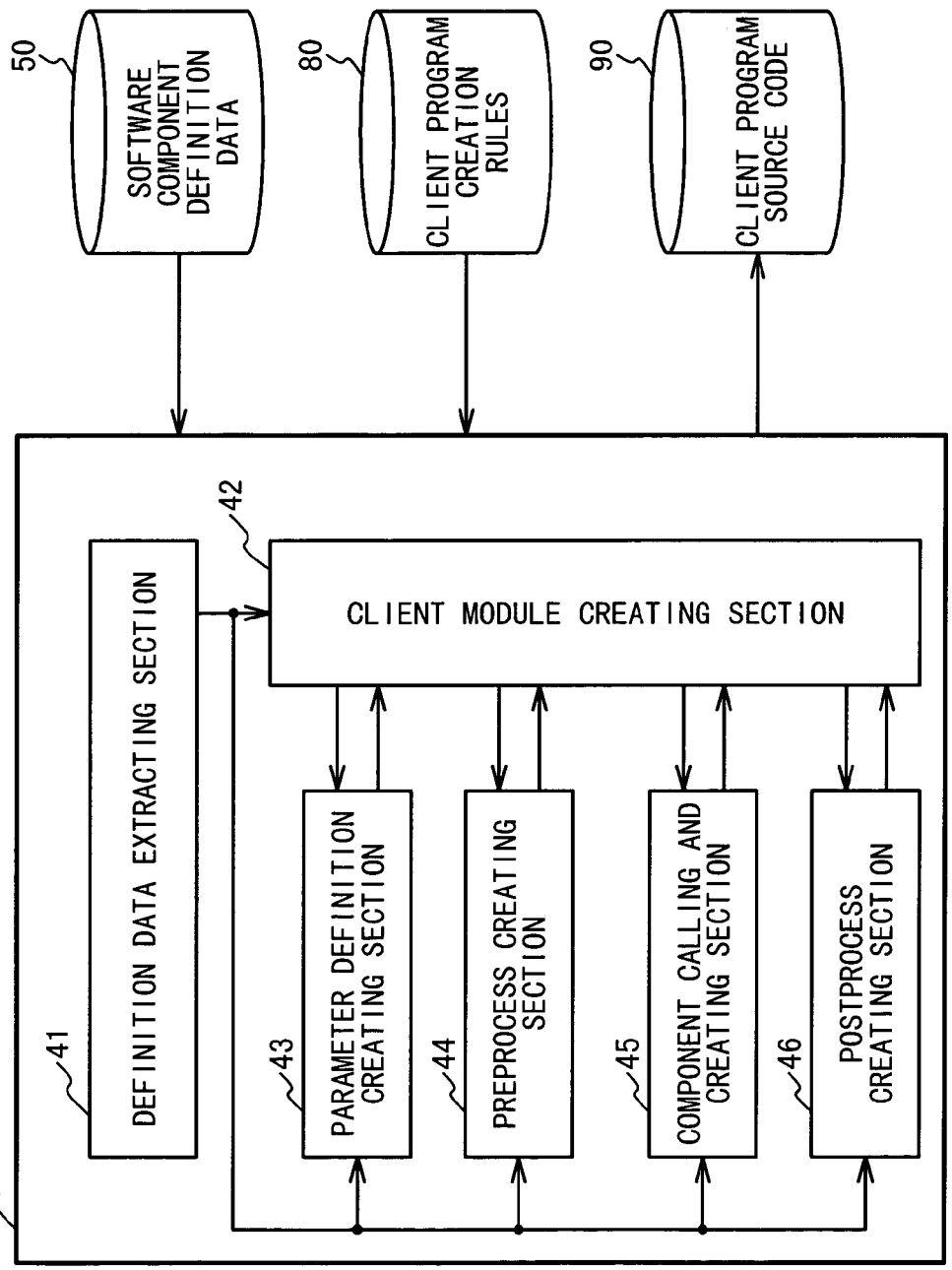
FIG. 13 is a block diagram showing a configuration example of an automatic client program creating section.
Figure 14:
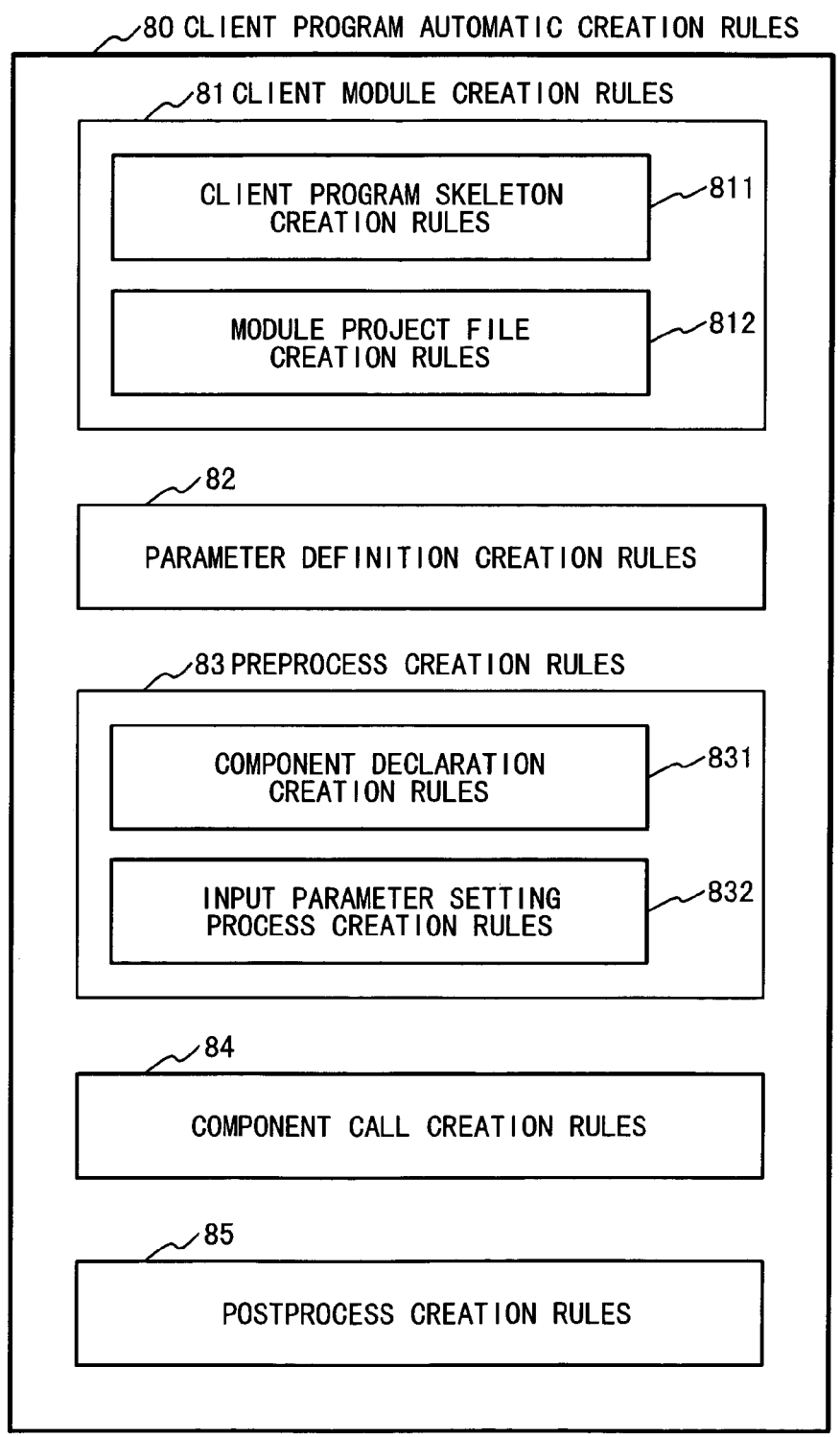
FIG. 14 is a view showing an example of client program creation rules.

The automatic client program creating section 40 is composed of a definition data extracting section 41, a client module creating section 42, a parameter definition creating section 43, a pre-process creating section 44, a component call creating section 45 and a post-process creating section 46, as shown in FIG. 13. Also, the client program creation rules 80 are a set of the various rules to be used when the automatic client program creating section 40 creates the source code 90 of the client program based on the software component definition data 50. As shown in FIG. 14, the client program creation rules 80 includes client module creation rules 81, parameter definition creation rules 82, pre-process creation rules 83, component call creation rules 83 and post-process creation rules 85. Moreover, the client module creation rules 81 contain client program framework creation rules 811 and project file creation rules 812 of a module, and the pre-process creation rules 83 contain component declaration creation rules 831 and input parameter setting process creation rules 832.

The definition data extracting section 41 extracts the definition data required by the respective sections 42 to 46 from the software component definition data 50.

The client module creating section 42 suitably refers to the software component definition data 50 and the client module creation rules 81 and also suitably calls the parameter definition creating section 43, the pre-process creating section 44, the component call creating section 45 and the post-process creating section 46 and then creates the entire framework of the source code 90 of the client program.

The parameter definition creating section 43 suitably refers to the software component definition data 50 and the parameter definition creation rules 82 in response to a parameter definition creation request from the client module creating section 42, and then creates the declaration and definition of a parameter corresponding to a method called from the client program.

The pre-process creating section 44 suitably refers to the software component definition data 50 and the pre-process creation rules 83 in response to a pre-process creation request from the client module creating section 42, and then creates a pre-process, which needs to be executed prior to a call of a software component, such as a process of setting of a value for a property or a parameter that must be executed prior to a call of a method. Another initializing process fixedly necessary is created here.

The component call creating section 45 suitably refers to the software component definition data 50 and the component call creation rules 84 in response to a component call creation request from the client module creating section 42, and then creates a portion of calling a method of a software component.

The post-process creating section 46 suitably refers to the software component definition data 50 and the post-process creation rules 85 in response to a post-process creation request from the client module creating section 42, and then creates a post-process, which needs to be executed after a call of a software component, such as a process of acquiring a value of a parameter that must be executed after a call of a method. An error process and another initializing process fixedly necessary are created here.

The functions of the client module creating section 42, the parameter definition creating section 43, the pre-process creating section 44, the component call creating section 45 and the post-process creating section 46 will be described below in detail in the above-mentioned order together with the content examples of the rules.

(3-1) Client Module Creating Section 42 and Client Module Creation Rules 81

Figure 15:
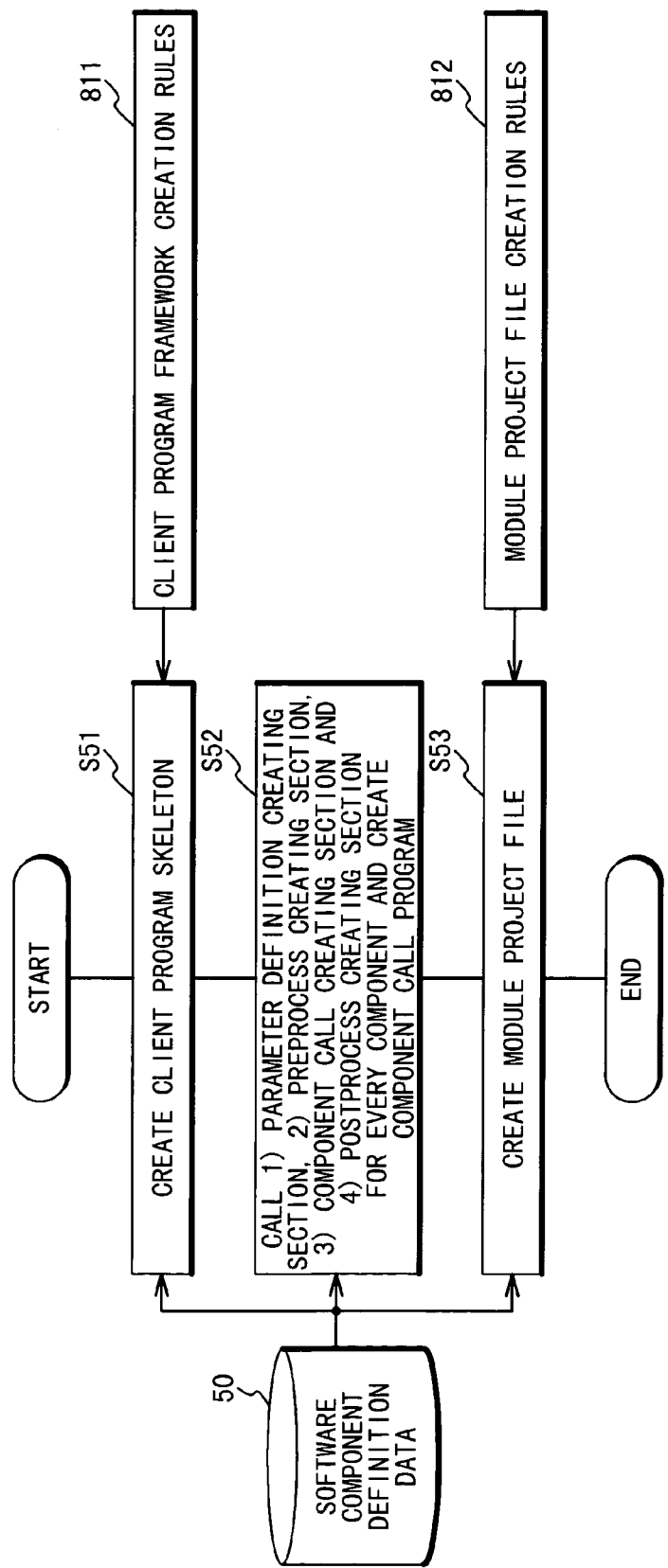
FIG. 15 is a flowchart showing a processing example of a client module creating section within the automatic client program creating section.

FIG. 15 shows a processing example of the client module creating section 42. The client module creating section 42 firstly acquires the component names 521 in all the component data 52 associated with the module data 51 from the software component definition data 50 by the definition data extracting section 41. Then, the client module creating section 42 creates the framework of a client program corresponding to each component based on the acquired component names 521 and the client program framework creation rules (S51). For example, the following rule is described in advance in the client program framework creation rules 811.

[An acquired component name is set for the following
   section of a component name of a template, and a framework of a client is created].
Dim Component Name As Object
Public Sub Main( )
End Sub]

Thus, the frameworks of the following three client programs are created if it is supposed that the acquired component names are "Component1", "Component2" and "Component3".

1) Framework of Client Program Corresponding to "Component1"
Dim Component1 As Object
Public Sub Main( )
End Sub
2) Framework of Client Program Corresponding to "Component2"
Dim Component2 As Object
Public Sub Main( )

In the parameter definition creation rule 82, a rule is provided in which the parameter name 541 and its type 542 are linked through "As" after "Dim" to create the parameter definition. Thus, when it is supposed that there are three parameter names 541 of "Pram1", "Pram2" and "Param3" and that their types 542 are "String", "Integer" and "Long", the following parameter definition is created.

Dim Param1 As String
Dim Param2 As Integer
Dim Param3 As Long (3—3) Pre-Process Creating Section 44 and Pre-Process Creation Rules 83

Figure 17:
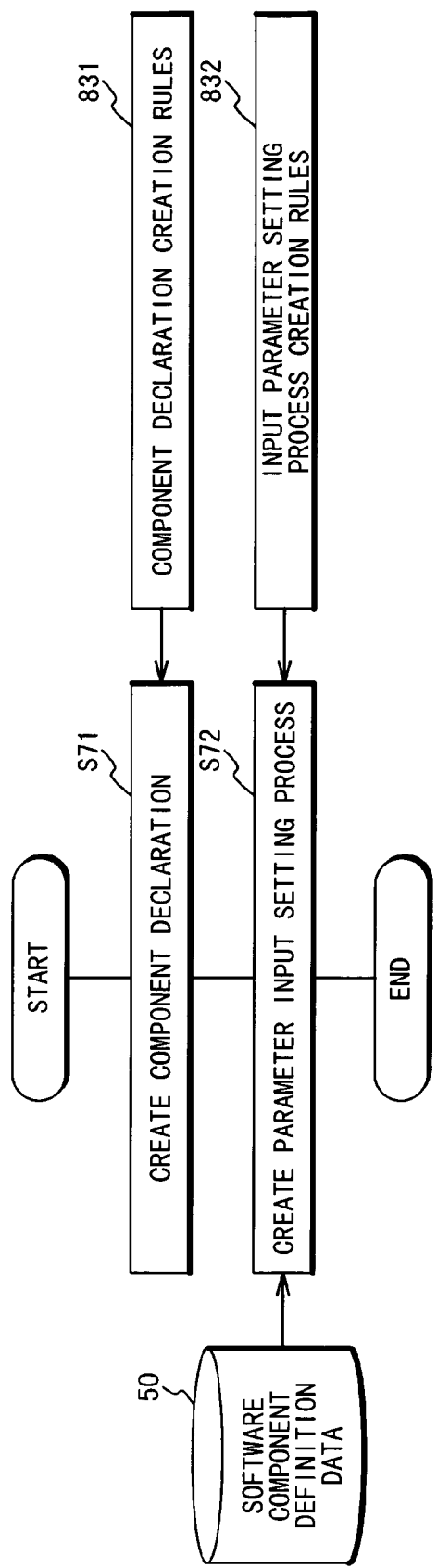
FIG. 17 is a flowchart showing a processing example of a pre-process creating section within the automatic client program creating section.

FIG. 17 shows a processing example of the pre-process creating section 44. When the pre-process creating section 44 is called from the client module creating section 42 by specifying a module name and a component name, the pre-process creating section 44 creates a declaration of a component in accordance with the component declaration creation rules 831 (S71). For example, the following rule is provided in advance in the component declaration creation rule 831.

[A module name and a component name are set for the following sections of a module name and a component name of a template, and a declaration of a component is created.
Dim Component Name As Object
Set Component Name=CreateObject ("ModuleName.ComponentName")]

Thus, when it is supposed that a module name is "Module1" and a component name is "Component1", the following component declaration is created:
Dim Component1 As Object
Set Component1=CreateObject ("Module.Component1")

Next, the pre-process creating section 44 refers to the parameter data 54 associated with the method data 53 associated with the module name and the component name, from the software component definition data 50 through the definition data extracting section 41. Then, the pre-process creating section 44 creates a setting process for a parameter serving as an input (an input parameter and an input/output parameter) in accordance with the input parameter setting process creation rules 832 (S72). Actually, the pre-process creating section 44 refers to the parameter input/output type data 543 for each parameter name 541 in the parameter data 54, and extracts only the parameter name 541 responsible for the input parameter or the input/output parameter. Then, the pre-process creating section 44 creates the setting process for the input parameter in accordance with the input parameter setting process creation rules 832. For example, the following rule is provided in advance in the input parameter setting process creation rule 832.

[A parameter name is set for a following section of a parameter name of a template, and a setting process for an input parameter is created.
Parameter Name=?]

Thus, when it is supposed that "Param1", "Param2" and "Param3" are input or input/output parameter names, the following input parameter setting process is created.
Param1=?
Param2=?
Param3=?

(3-4) Component Call Creating Section 45 and Component Call Creation Rules 84

Figure 18:
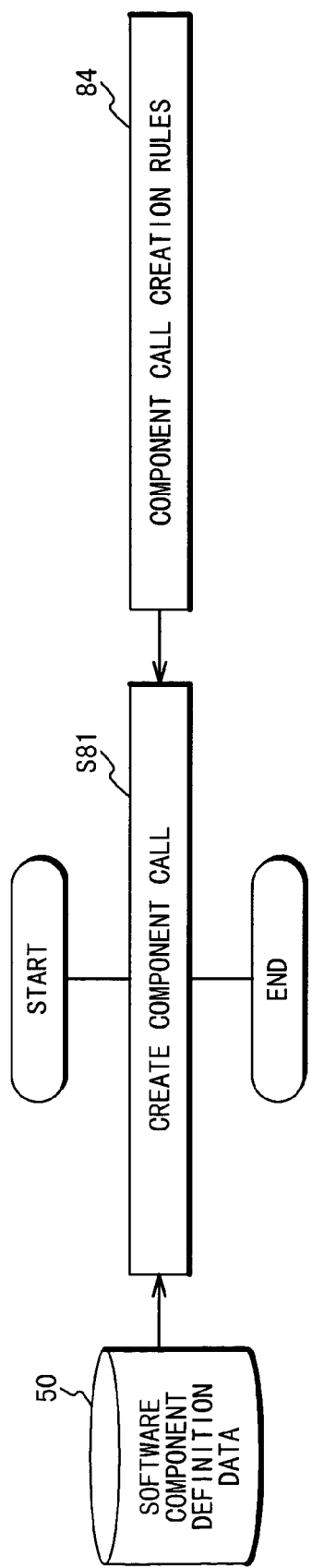
FIG. 18 is a flowchart showing a processing example of a component call creating section within the automatic client program creating section.

FIG. 18 shows a processing example of the component call creating section 45. When the component call creating section 45 is called from the client module creating section 42 by specifying a module name and a component name, the component call creating section 45 acquires from the software component definition data 50 through the definition data extracting section 41, method names in all the method data 53 associated with the component data 52 having the specified module name and the specified component name, and the method call order data 534, and all parameter names 541 associated with each
End Sub
3) Framework of Client Program Corresponding to "Component3"
Dim Component3 As Object
Public Sub Main( )
End Sub Then, the client module creating section 42 suitably refers to the software component definition data 50 by the definition data extracting section 41 for each component, and calls the parameter defining section 43, the pre-process creating section 44, the component call creating section 45 and the post-process creating section 46. Then, the client module creating section 42 creates each program for the parameter definition, the pre-process, the component call and the post-process in each proper section (in short, a section complying with an output position or an output order of each data specified in the rule) within the framework created for each component, and then creates the program for calling the component (S52).

Next, the client module creating section 42 creates a project file (userapp.vbp) that describes names of components of a project in accordance with the software component definition data 50 and the project file creation rules 812 of the module (S53).

A template for a project file is provided in the project file creation rules 812 of the module. Thus, the client module creating section 42 can create the project file by setting a component name for the template. For example, it is supposed that there are three component names of "Component1", "Component2" and "Component3". In this case, the project file is created which has the following content:
Module=Component1; Component1.bas;
Module=Component2; Component2.bas; and
Module=Component3; Component3.bas.

(3-2) Parameter Definition Creating Section 43 and Parameter Definition Creation Rules 82

Figure 16:
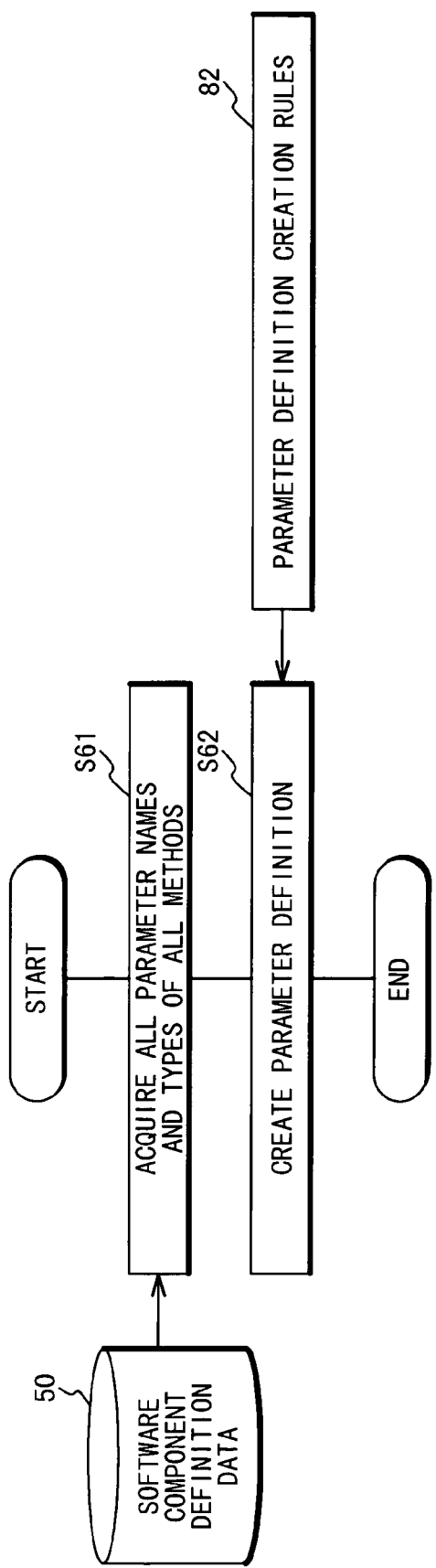
FIG. 16 is a flowchart showing a processing example of a parameter definition creating section within the automatic client program creating section.

FIG. 16 shows a processing example of the parameter definition creating section 43. When the client module creating section 42 is called from the client module creating section 42 by specifying a component name, the parameter definition creating section 43 acquires all parameter names 541 in all the method data 53 associated with the component data 52 corresponding to the component name and their types 542, from the software component definition data 50 through the definition data extracting section 41 (S61). Then, the parameter definition creating section 43 creates the parameter definition in accordance with the parameter definition creation rule 82 (S62). method data 53. Then, the component call creating section 45 creates a component call for calling each method specified by the call order data 534, in accordance with the component call creation rules 84 (S81). For example, the following rule for each of method call types is provided in advance in the component call creation rule 84.

[Each name is set for the following sections of a component name, a method name and a parameter name of a template, and a component call process is created. Call Component Name, Method Name, Parameter Name]

Thus, when it is supposed that a component name is "ComponentName", there are four method names of "Bind", "Send", "Recv" and "Unbind", there are "Param1" and "Param2" as "Send" parameters, there are "Param3" and "Param4" as "Recv" parameters, and a method call order specified by the call order data 534 is an order of "Bind", "Send", "Recv" and "UnBind". For example, the following component call process is created.

Call ComponentName.Bind( )
Call ComponentName.Send(Param1, Param2)
Call ComponentName.Recv(Param3, Param4)
Call ComponentName.UnBind( )

It should be noted that the setting process for the value created by the pre-process creating section 44 for the parameter serving as the input within "Param1" and "Param2" is assembled immediately before "Call ComponentName.Send (Param1, Param2)", and the acquiring process for the value created by the post-process creating section 46 for the parameter serving as the output within "Param3" and "Param4" is assembled immediately after it. Also, the setting process for the value created by the pre-process creating section 44 for the parameter serving as the input within "Param3" and the "Param4" is assembled immediately before "Call ComponentName.Recv (Param3, Param4)", and the acquiring process for the value created by the post-process creating section 46 for the parameter serving as the output within "Param3" and "Param4" is assembled immediately after it.

(3-5) Post-Process Creating Section 46 and Post-process Creation Rules 85

Figure 19:
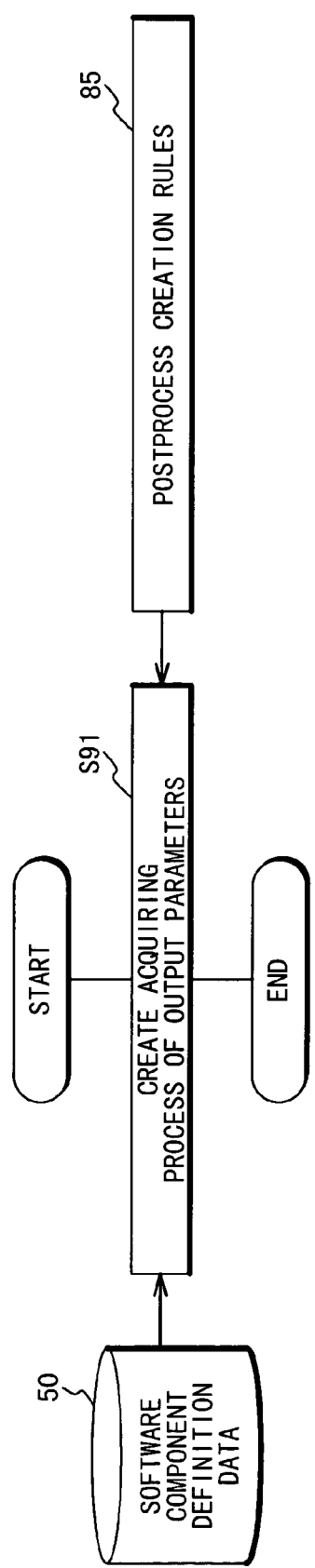
FIG. 19 is a flowchart showing a processing example of a post-process creating section within the automatic client program creating section.

FIG. 19 shows a processing example of the post-process creating section 46. When the post-process creating section 46 is called by specifying a module name and a component name from the client module creating section 42, the post-process creating section 46 refers through the definition data extracting section 41, to the parameter data 54 associated with the method data 53 which is associated with the module name and the component name. Then, the post-process creating section 46 creates the acquiring process for the value from the parameter serving as the output (the output parameter and the input/output parameter) in accordance with an output parameter setting process creation rule (not shown) in the post-process creation rules 85. Actually, the post-process creating section 46 refers to the parameter input/output type data 543 for each parameter name 541 in the parameter data 54, and extracts only the parameter name 541 serving as the output parameter or the input/output parameter. Then, the post-process creating section 46 creates the acquiring process for the value of the output parameter in accordance with the output parameter setting process creation rule. For example, the following rule is provided in advance in the output parameter setting creation rules in the post-process creation rules 85.

[A parameter name is set for the following section of a parameter name of a template, and an acquiring process for a value of an output parameter is created.
?=Parameter Name]

Thus, when it is supposed that "Param1", "Param2" and "Param3" are output or input/output parameter names, the following input parameter setting process is created.
?=Param1
?=Param2
?=Param3

It should be noted that another embodiment may be considered so as to separately include the definition data necessary to create the software component and the definition data necessary to create the client program. In such a case, the two definition units are required, and the definition of a user needs to be carried out two times. Also, the creation operations need to be carried out separately from each other. On the contrary, in the above-mentioned embodiment, the automatic client program creating section 40 and the automatic software component creating section 30 use the common definition data 50. Thus, the definition unit is sufficient to have only one interface and an operation of the user is sufficient to be carried out once.

In the system for automatically creating a software component according to the present invention, the software component defining section, in addition to data necessary to create a software component, receives even data necessary to create a client program using the software components from the user input/output unit, and creates the software component definition data. The automatic software component creating section creates the software components based on the software component definition data. On the other hand, the automatic client program creating section creates a source code of the client program based on the software component definition data. At this time, the component call creating section within the automatic client program creating section refers to an data about an order of calling methods in the software component corresponding to messages given to a transaction process program, in a one-to-one relationship, from the software component definition data, and creates a description of a part of calling the methods in the client program. Accordingly, it is not necessary for a developer of the client program itself to describe the part of calling the methods. Also, it is not necessary to inquire of a technician of a mainframe about the order of calling the methods.

If the data necessary to create the client program includes the data about a parameter input/output type specified by a message given to the transaction process program, the pre-process creating section within the automatic client program creating section refers to the data about the parameter input/output type, and describes a process for setting a value for the parameter before calling a method having an input parameter. The post-process creating section refers to the data about the parameter input/output type, and describes a process for acquiring a value of the parameter after calling a method having an output parameter. In the description of the process for setting the value for the parameter, which is described by the pre-process creating section, an input source of the value is unknown when a source code of the client program is created. Thus, a predetermined symbol (for example, [?]) indicative of the unknown fact is used to create as a description, for example, such as [Parameter Name=?]. Therefore, the developer of the client program can easily understand what kind of data is outputted when a certain data is inputted. It should be noted that the data of a place serving as an actual input source and an actual output destination (for example, the data about an input column and an output column on a GUI screen designed by the developer of the client program) is manually set for the portion [?].

As mentioned above, according to the present invention, in addition to the data necessary to create the software component, the definition data including even the data necessary to create the client program using the software component is inputted and stored as the software component definition data. Then, the source code of the client program is automatically created in accordance with this definition data. Thus, even the person having no knowledge of the mainframe can develop the client program using the software components to access to the mainframe. Moreover, most portions of the source code in the client program such as the typical portion can be automatically created. Therefore, it is possible to largely reduce the burden on the developer of the client program.

What is claimed is:

1. An automatic software component creating system comprising:
   a software component definition data storage section which stores software component definition data therein;
   a software component creation rule storage section which stores software component creation rules therein;
   a client program creation rule storage section which stores client program creation rules therein;
   a software component creating section which creates a software component module with one or more software components based on said software component definition data and said software component creation rules in response to a start instruction; and
   a client program creating section which creates a client program source code based on said software component definition data, said software component module, and said client program creation rules, when said software component module is created,
   wherein said software component creating section comprises:
      a parameter creating section which creates parameter(s) from said software component definition data and parameter creation rules in response to a parameter creation request;
      a method creating section which generates said parameter creation request while creating method(s) from said software component definition data and method creation rules in response to a method creation request;
      a component creating section which generates said method creation request while creating component (s) from software component definition data and component creation rules in response to a component creation request; and
      a module creating section which generates said component creation request while creating said software component module from said software component definition data and module creation rules.

2. The automatic software component creating system according to claim 1, wherein said software component definition data includes module data which includes at least one component data, which includes at least one method data, which includes at least one parameter data.

3. The automatic software component creating system according to claim 2, wherein said module data includes a module name,
   said component data includes component data and component attribute data,
   said method data includes a method name, method attribute data, method call format data, and method call order data, and
   said parameter data includes a parameter name, a parameter type, and a parameter type data.

4. The automatic software component creating system according to claim 2, further comprising:
   a software component defining section which defines said software component definition data from inputted data to store in said software component definition data storage section.

5. The automatic software component creating system according to claim 4, wherein said software component defining section comprises:
   a component data defining section which defines said component data associated with said module data from said inputted data;
   a method data defining section which defines said method data associated with said component data from said inputted data; and
   a parameter data defining section which defines said parameter data associated with the method data from said inputted data.

6. The automatic software component creating system according to claim 1, wherein said software component creation rules comprise:
   said module creation rules, in each of which a rule for creation of a project file of said module is described;
   said component creation rules including component framework creation rules in each of which a rule for creation of a framework of said component is described, property creation rules in each of which a rule for creation of a property of said component is described, and initial value creating rules, in each of which initial values to be set in said property are described;
   said method creation rules including method framework creation rules in each of which a rule for creation of a framework of said method is described, and method logic creation rules in each of which logic to be executed by said method is described; and
   said parameter creation rules in each of which it is described that a parameter name and a type of parameter are linked.

7. An automatic software component creating system comprising:
   a software component definition data storage section which stores software component definition data therein;
   a software component creation rule storage section which stores software component creation rules therein;
   a client program creation rule storage section which stores client program creation rules therein;
   a software component creating section which creates a software component module with one or more software components based on said software component definition data and said software component creation rules in response to a start instruction; and
   a client program creating section which creates a client program source code based on said software component definition data, said software component module, and said client program creation rules, when said software component module is created,
   wherein said client program source code creating section comprises:
      a parameter definition creating section which creates a declaration and a definition of each of said parameters corresponding to a method to be called from a client program from said software component definition data and parameter definition creation rules of said client program creation rules in response to a parameter definition creation request;
      a pre-process creating section which creates a pre-process which is executed prior to a call of said software component based on said software component definition data and pre-process creation rules of said client program creation rules in response to a pre-process creation request;

a component call creating section which creates a call process of each of said methods of said software component based on said software component definition data and component call creation rules of said client program creation rules in response to a component call creation request;

a post-process creating section which creates a post-process, which is executed after the call of said software component based on said software component definition data and post-process creation rules of said client program creation rules in response to a post-process creation request; and a client module creating section which creates a framework of said client program source code based on said software component definition data and client module creation rules of said client program creation rules while respectively outputting said parameter definition creation request, said pre-process creation request, said component call creation request and said post-process creation request to said parameter definition creating section, said pre-process creating section, said component call creating section, and said post-process creating section.

8. An automatic software component creating method comprising:

creating a software component module with one or more software components based on software component definition data and software component creation rules in response to a start instruction; and creating a client program source code based on said software component definition data, said software component module, and client program creation rules, when said software component module is created, wherein said creating said software comnonent module comprises:

generating a component creation request while creating said software component module from said software component definition data and module creation rules of said software component creation rules;

generating a method creation request while creating component(s) from software component definition data and component creation rules of said software component creation rules in response to said component creation request;

generating a parameter creation request while creating method(s) from said software component definition data and method creation rules of said software component creation rules in response to said method creation request; and creating parameter(s) from said software component definition data and parameter creation rules in response to said parameter creation request.

9. The automatic software component creating method according to claim 8, wherein said software component definition data includes module data which includes at least one component data, which includes at least one method data, which includes at least one parameter data.

10. The automatic software component creating method according to claim 9, wherein said module data includes a module name, said component data includes component data and component attribute data, said method data includes a method name, method attribute data, method call format data, and method call order data, and said parameter data includes a parameter name, a parameter type, and a parameter type data.

11. The automatic software component creating method according to claim 9, further comprising:

defining said software component definition data from inputted data.

12. The automatic software component creating method according to claim 11, wherein said defining said software component definition data from inputted data comprises:

defining said component data associated with said module data from said inputted data;

defining said method data associated with said component data from said inputted data; and defining said parameter data associated with the method data from said inputted data.

13. An automatic software component creating method comprising:

creating a software component module with one or more software components based on software component definition data and software component creation rules in response to a start instruction; and creating a client program source code based on said software component definition data, said software component module, and client program creation rules, when said software component module is created, wherein said creating said client program source code comprises:

creating a declaration and a definition of each of said parameters corresponding to a method to be called from a client program from said software component definition data and parameter definition creation rules of said client program creation rules in response to a parameter definition creation request;

creating a pre-process which is executed prior to a call of said software component based on said software component definition data and pre-process creation rules of said client program creation rules in response to a pre-process creation request;

creating a call process of each of said methods of said software component based on said software component definition data and component call creation rules of said client program creation rules in response to a component call creation request;

creating a post-process, which is executed after the call of said software component based on said software component definition data and post-process creation rules of said client program creation rules in response to a post-process creation request; and creating a framework of said client program source code based on said software component definition data and client module creation rules of said client program creation rules while generating said parameter definition creation request, said pre-process creation request, said component call creation request and said post-process creation request.

14. An automatic software component creating system, comprising: a client program creating section which automatically creates a client program source code based on a parent software component, wherein said client program source code creating section comprises:

a parameter definition creating section which creates a declaration and a definition of each parameter corresponding to a method to be called from a client program from said parent software component and parameter definition creation rules of a client program creation rules in response to a parameter definition creation request;

a pre-process creating section which creates a pre-process which is executed prior to a call of said software component based on said parent software component definition data and pre-process creation rules of said client program creation rules in response to a pre-process creation request;

a component call creating section which creates a call process of each of said methods of said parent software component based on said software component definition data and component call creation rules of said client program creation rules in response to a component call creation request;

a post-process creating section which creates a post-process, which is executed after the call of said parent software component based on said software component definition data and post-process creation rules of said client program creation rules in resoonse to a post-process creation request; and a client module creating section which creates a framework of said client program source code based on said parent software component definition data and client module creation rules of said client program creation rules while respectively outputting said parameter definition creation request, said pre-process creation request, said component call creation request and said post-process creation request to said parameter definition creating section, said pre-process creating section, said component call creating section, and said post-process creating section.

15. An automatic software component creating system of claim 14, further comprising:

a software component creating section which creates said parent software component module with one or more software components based on software component definition data and software component creation rules in response to a start instruction.

* * * * *